(12) United States Patent
Tokuchi

(10) Patent No.: US 11,914,422 B2
(45) Date of Patent: Feb. 27, 2024

(54) INFORMATION PROCESSING SYSTEM AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 565 days.

(21) Appl. No.: 17/063,890

(22) Filed: Oct. 6, 2020

(65) Prior Publication Data
US 2021/0389804 A1 Dec. 16, 2021

(30) Foreign Application Priority Data
Jun. 10, 2020 (JP) .................. 2020-100763

(51) Int. Cl.
| | | |
|---|---|---|
| G06F 1/16 | (2006.01) | |
| G04G 19/12 | (2006.01) | |
| G06F 1/3212 | (2019.01) | |
| G04G 9/00 | (2006.01) | |

(52) U.S. Cl.
CPC ........... G06F 1/1647 (2013.01); G04G 9/007 (2013.01); G04G 19/12 (2013.01); G06F 1/163 (2013.01); G06F 1/1652 (2013.01); G06F 1/3212 (2013.01)

(58) Field of Classification Search
CPC ...... G06F 1/1647; G06F 1/163; G06F 1/1652; G06F 1/3212; G06F 1/1692; G04G 9/007; G04G 19/12; Y02D 10/00
See application file for complete search history.

(56) References Cited

U.S. PATENT DOCUMENTS

| | | | | |
|---|---|---|---|---|
| 10,831,244 | B1* | 11/2020 | DeMaio | G06F 1/1626 |
| 2011/0050544 | A1* | 3/2011 | Tomono | G06F 3/1446 |
| | | | | 345/1.3 |
| 2012/0129465 | A1* | 5/2012 | Suzuki | H04W 52/0241 |
| | | | | 455/67.11 |
| 2013/0314302 | A1* | 11/2013 | Jeung | G06F 3/1454 |
| | | | | 345/2.3 |
| 2015/0227245 | A1* | 8/2015 | Inagaki | G06F 3/0412 |
| | | | | 345/173 |
| 2019/0034150 | A1* | 1/2019 | Vigna | G06F 3/1423 |
| 2020/0335063 | A1* | 10/2020 | Kim | G06F 3/147 |

FOREIGN PATENT DOCUMENTS

| | | | |
|---|---|---|---|
| JP | 2008165818 A | * | 7/2008 |
| JP | 2015-179299 A | | 10/2015 |
| WO | 2017/204301 A1 | | 11/2017 |

* cited by examiner

*Primary Examiner* — William A Beutel
(74) *Attorney, Agent, or Firm* — Oliff PLC

(57) ABSTRACT

An information processing system include plural deformable devices to be worn on a living body for use, each device being configured to be detachably attached to at least another one of the devices, in which each device includes a display unit, and a processor, when communication among the plural devices is in a disconnection state, the processor of each device independently controls display of the corresponding one of the display units, and when the plural devices are in a communication state, the processors work cooperatively so as to control the display of the display units of the devices.

12 Claims, 23 Drawing Sheets

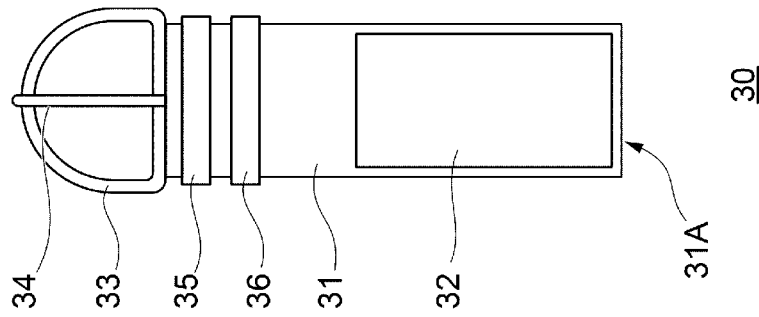
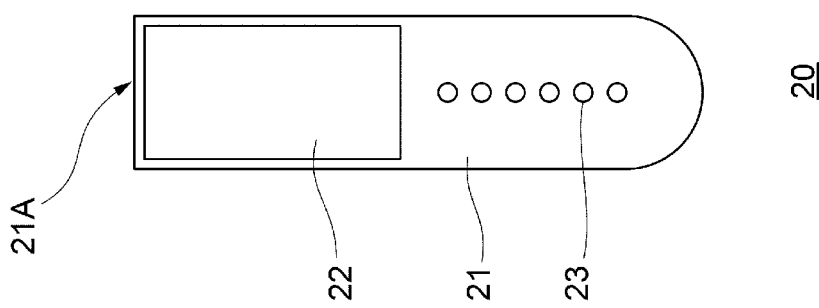
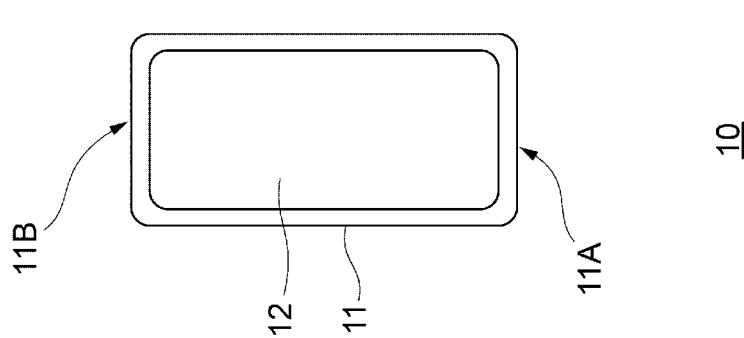

FIG. 7

| PATTERN | INFORMATION TERMINAL 10 | INFORMATION TERMINAL 20 | INFORMATION TERMINAL 30 |
|---|---|---|---|
| No.1 | ○ | ○ | ○ |
| No.2 | ○ | ○ | × |
| No.3 | ○ | × | ○ |
| No.4 | × | ○ | ○ |

○ : COMMUNICATION STATE
× : DISCONNECTION STATE

FIG. 8
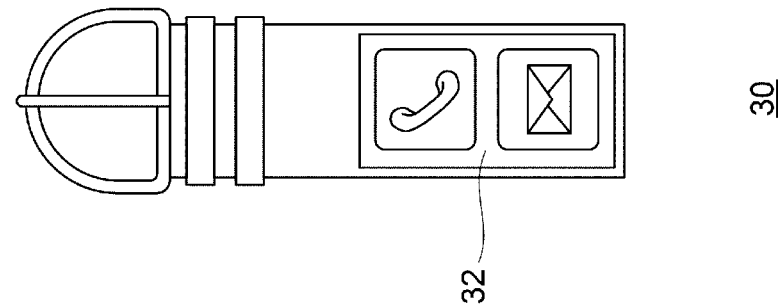
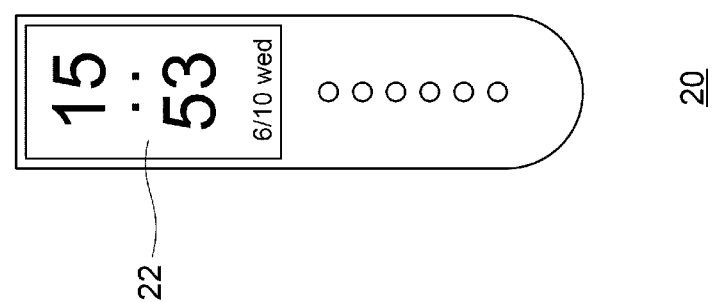
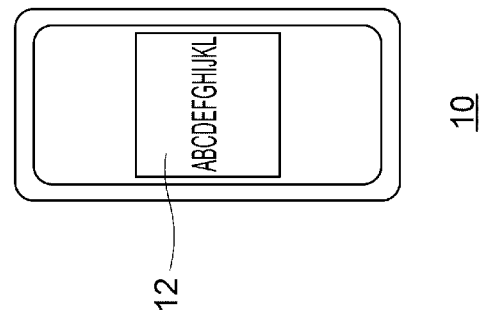

FIG. 14A
FIG. 14B
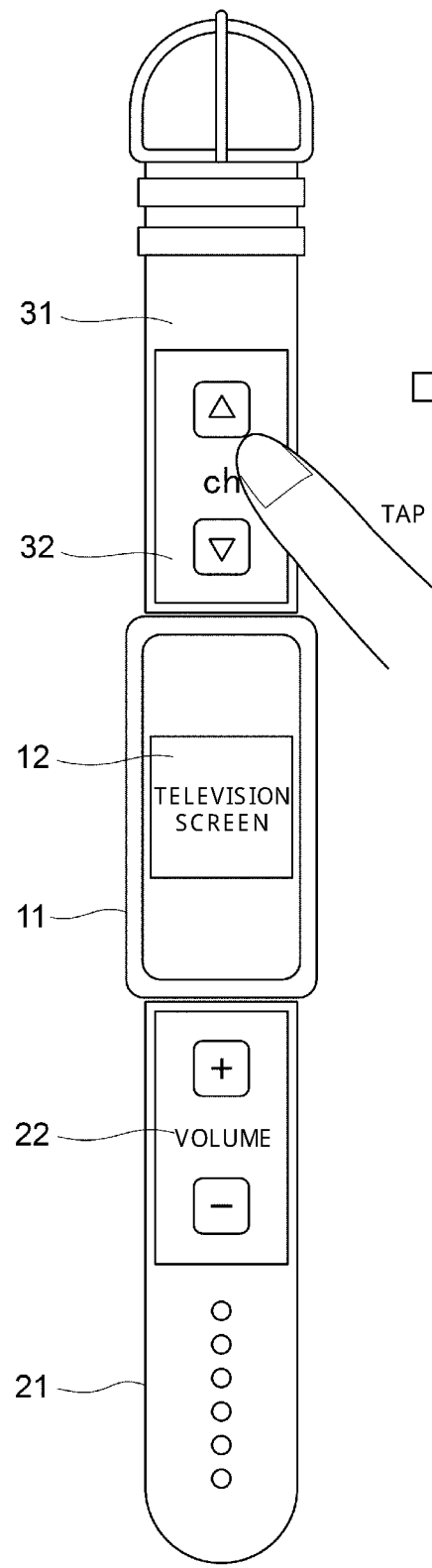
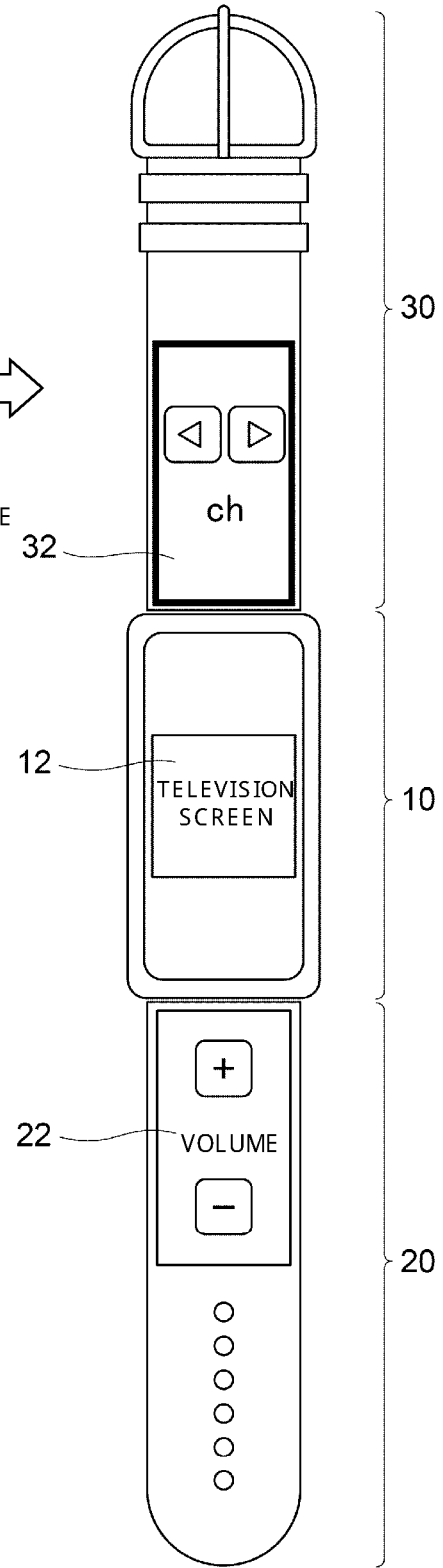

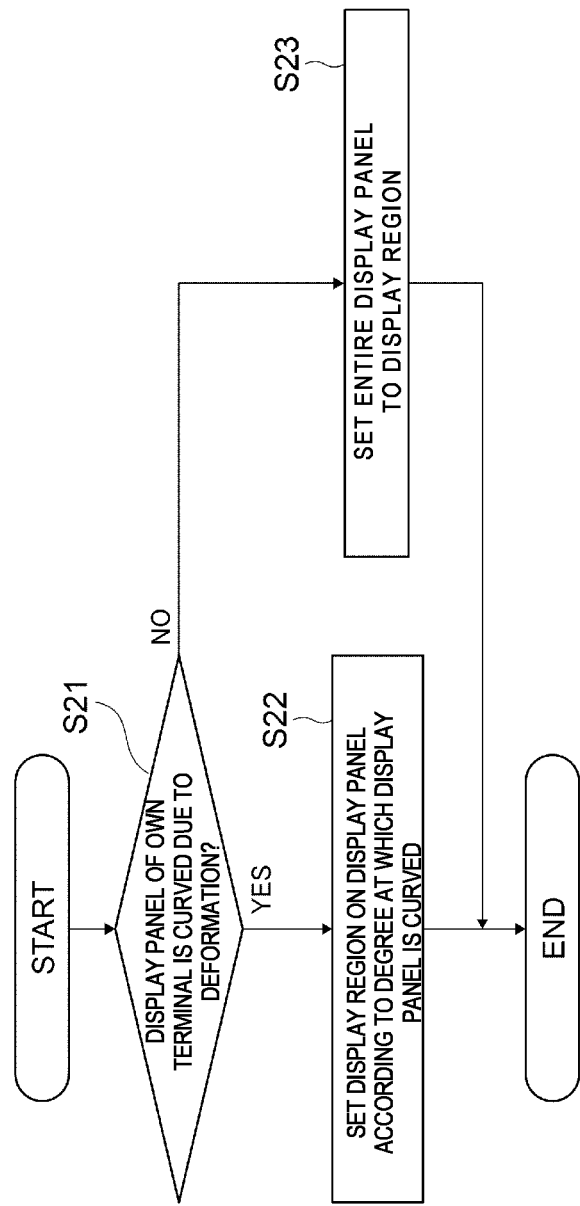

FIG. 18A
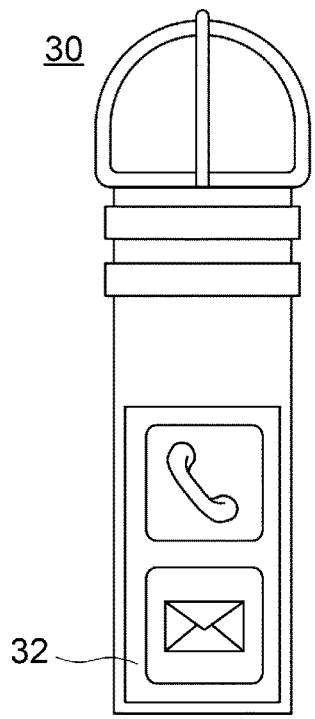
FIG. 18B
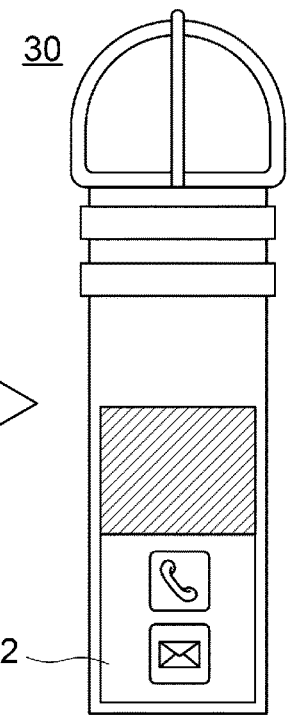
FIG. 18C
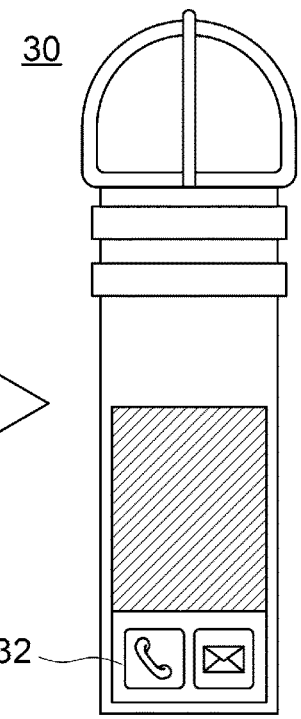
FIG. 18D
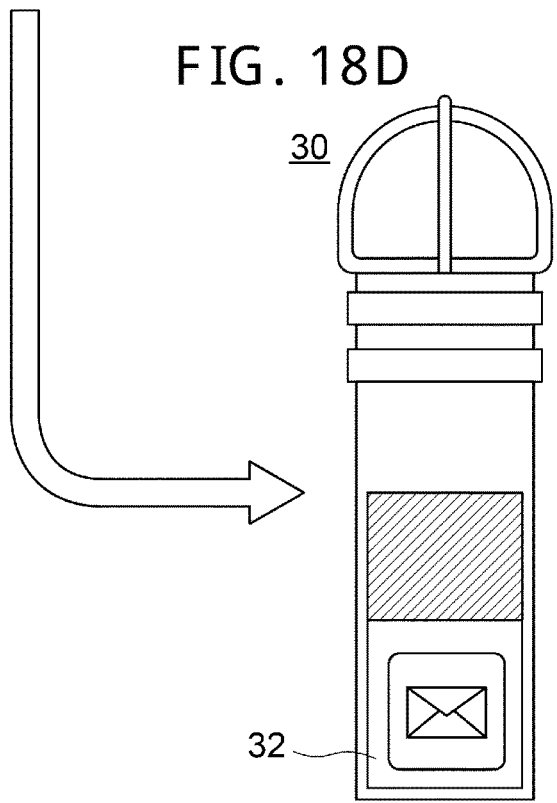
FIG. 18E
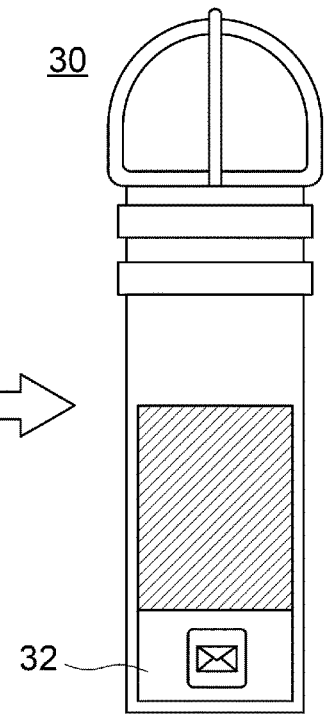
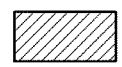 : PORTION NOT USED FOR DISPLAY OF DISPLAY PANEL

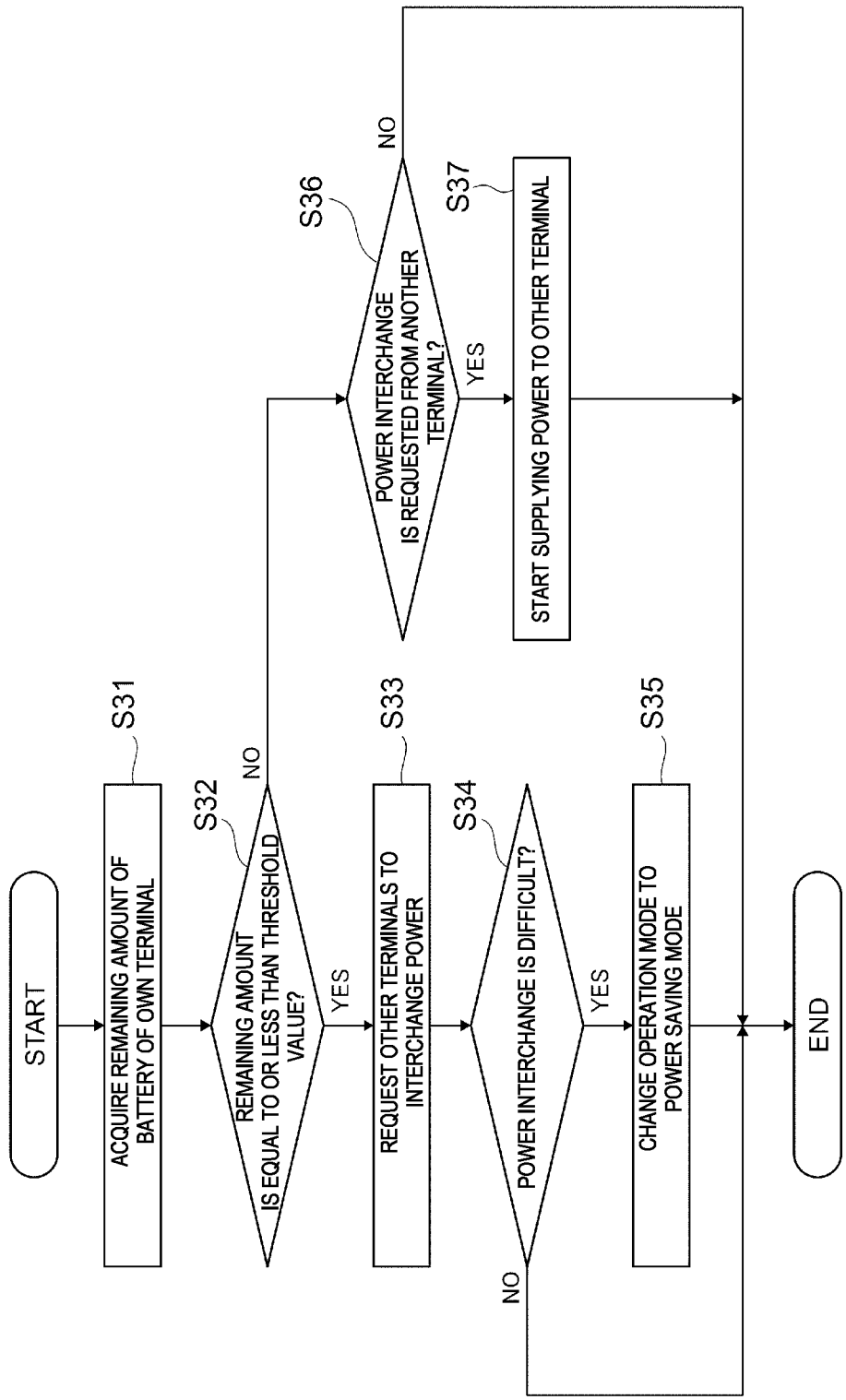

FIG. 21A  FIG. 21B  FIG. 21C
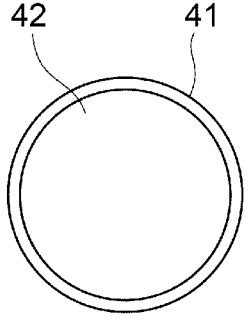
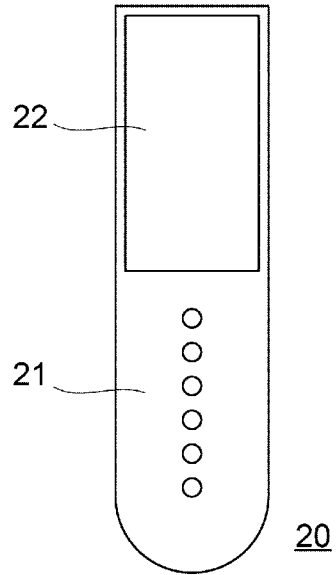
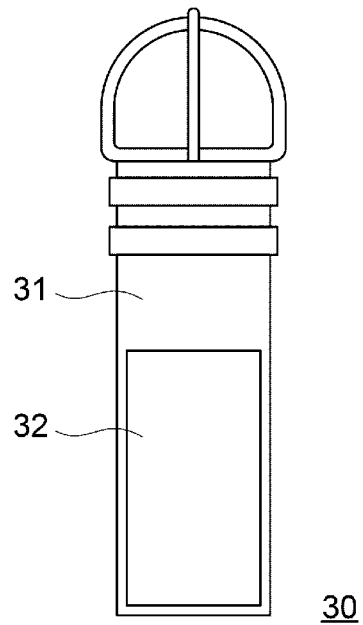
FIG. 21D
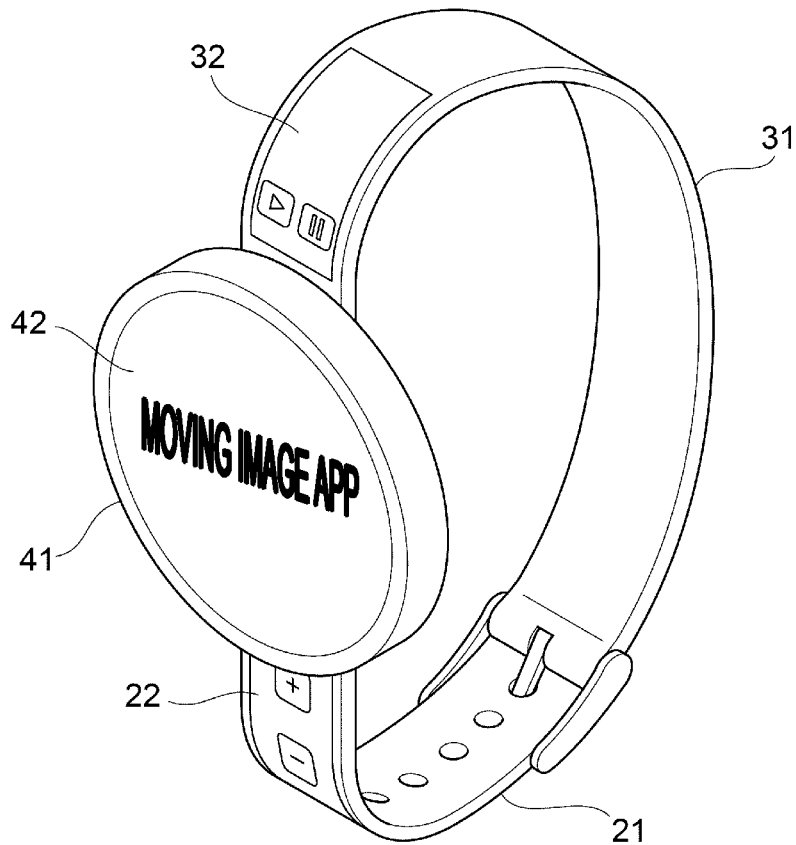

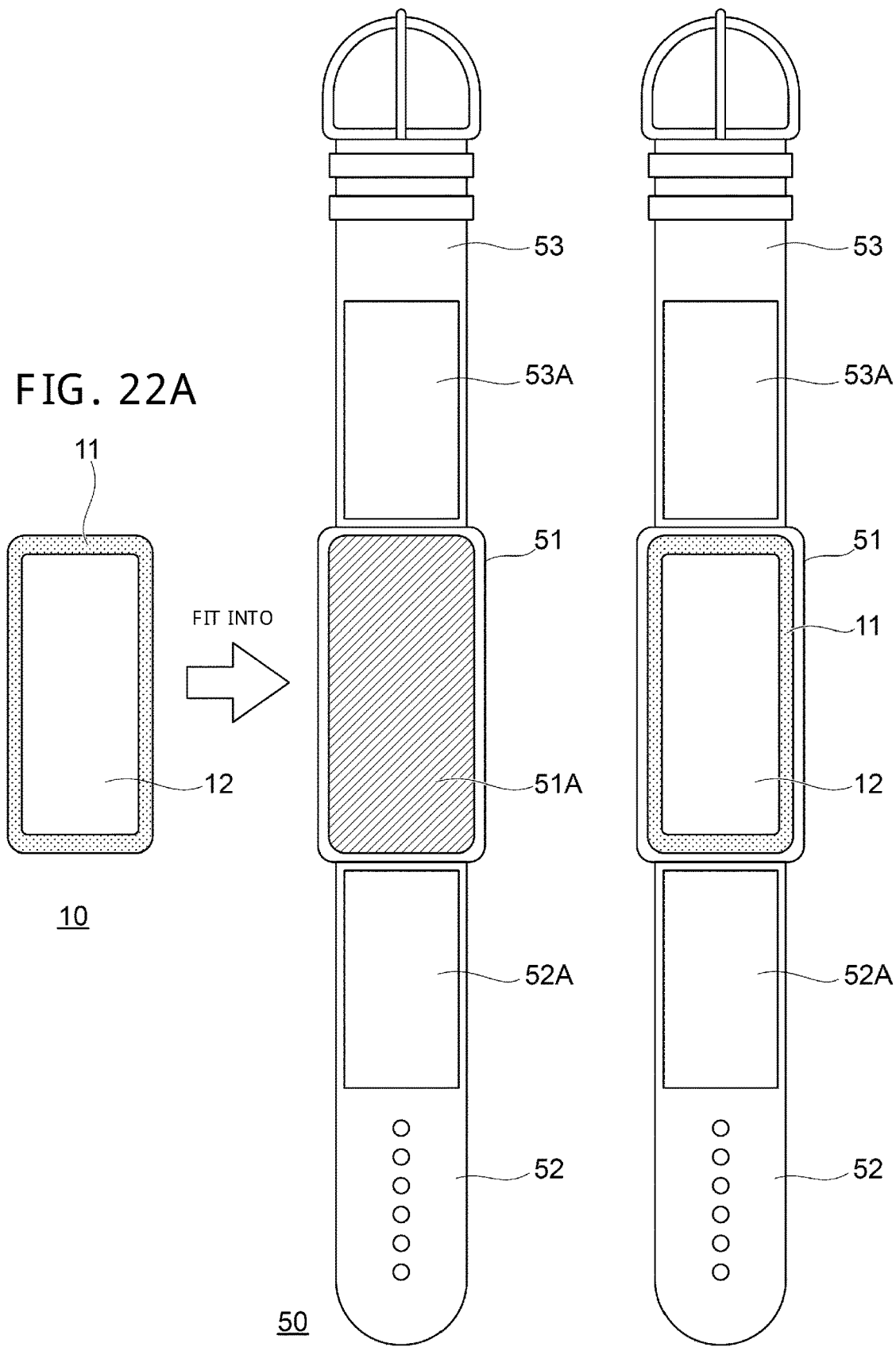

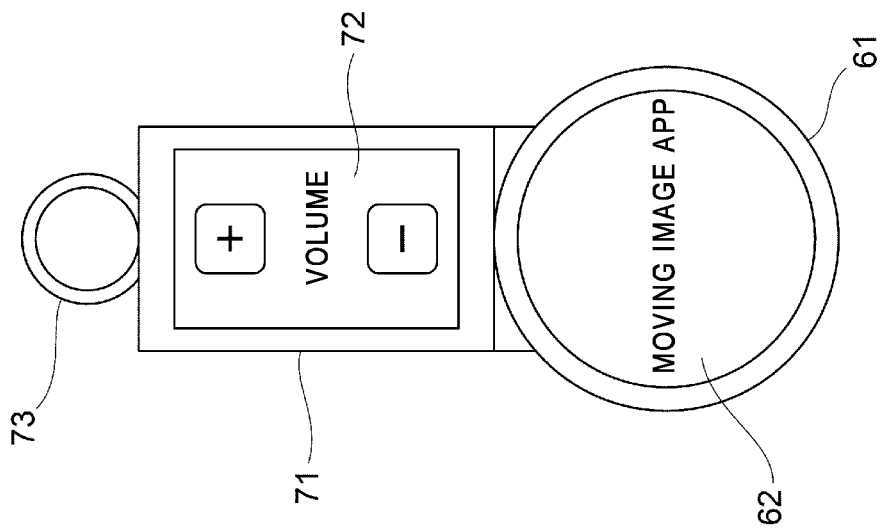
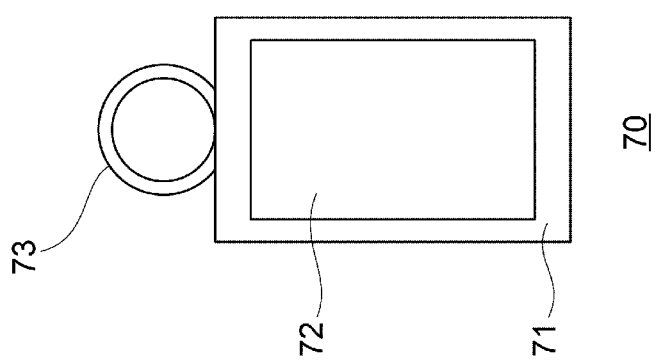
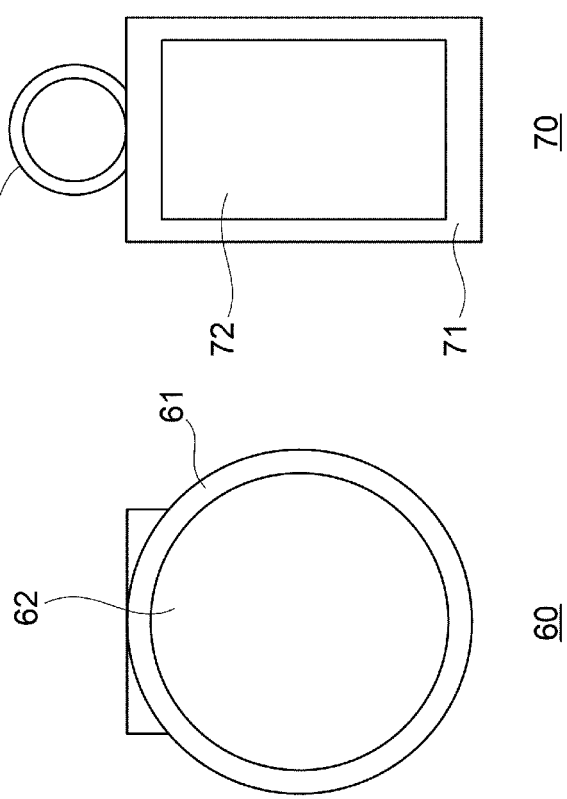

INFORMATION PROCESSING SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-100763 filed Jun. 10, 2020.

BACKGROUND

1. Technical Field

The present disclosure relates to an information processing system and a non-transitory computer readable medium.

2. Related Art

Currently, terminals worn on a wrist, an arm, or the like for use have been put into practical use. This type of terminals is an example of wearable devices. The wearable devices are classified into a wristwatch type, a bracelet type, and the like, depending on a wearing portion and a way of wearing.

SUMMARY

Displays of today are not only deformable but also has practical strength. Therefore, it is expected that an independent display can be provided in a wearing tool such as a belt and a band used for wearing on a wrist.

By the way, a current wearable device is an integrated product even when the wearable device includes plural members. It is not assumed that the plural members are detachably attached for independent use. Therefore, a processor is integrated in a main component.

Aspects of non-limiting embodiments of the present disclosure relate to providing various types of display as compared with a case of independently controlling content displayed by one deformable display device worn on a living body for use.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including plural deformable devices to be worn on a living body for use, each device being configured to be detachably attached to at least another one of the devices, in which each device includes a display unit, and a processor, when communication among the plural devices is in a disconnection state, the processor of each device independently controls display of the corresponding one of the display units, and when the plural devices are in a communication state, the processors work cooperatively so as to control the display of the display units of the devices.

BRIEF DESCRIPTION OF THE DRAWINGS

Exemplary embodiment(s) of the present disclosure will be described in detail based on the following figures, wherein:

FIGS. 1A to 1C are diagrams showing examples of appearances of three information terminals used in an exemplary embodiment, FIG. 1A shows an example of an appearance of an information terminal, FIG. 1B shows an example of an appearance of an information terminal, and FIG. 1C shows an example of an appearance of an information terminal;

FIG. 7 is a diagram showing an example of a communication pattern among the three information terminals;

FIG. 8 is a diagram showing a display example of the three information terminals in a state where communication is disconnected;

FIGS. 14A and 14B are diagrams showing a change in display when user operation is completed on one terminal, FIG. 14A shows display before the change, and FIG. 14B shows display after the change;

FIG. 15A shows display before the change, and FIG. 15B shows display after the change;

FIG. 16 is a flowchart showing an example of processing operation used by the three information terminals used in the exemplary embodiment to set a display region;

FIG. 17A shows an example of the display region when the wrist is thin, FIG. 17B shows an example of the display region when the wrist has a medium thickness, and FIG. 17C shows an example of the display region when the wrist is thick;

FIGS. 18A to 18E are diagrams showing a change in display content with a change in the display region, FIG. 18A shows a state where an image can be displayed on the entire display module, FIGS. 18B and 18D show a state where a displayable region on the display module is narrower than that in FIG. 18A, FIGS. 18C and 18E show a state where the displayable region on the display module is further narrower than that in FIGS. 18B and 18D;

FIG. 19 is a flowchart showing an example of processing operation used by the three information terminals used in the exemplary embodiment to interchange power;

FIGS. 21A to 21D are diagrams showing another example of an appearance of a smart watch including three information terminals, FIG. 21A shows an information terminal having a substantially cylindrical body and a circular display module, FIG. 21B shows an information terminal corresponding to a belt on a tip end side, FIG. 21C shows an information terminal corresponding to a belt on a buckle side, and FIG. 21D shows an external configuration in which the three information terminals are combined;

FIGS. 22A to 22C are diagrams showing an example of an appearance of a smart watch including two information terminals, FIG. 22A shows an information terminal that is attachable to a recess, FIG. 22B shows the other information terminal that has a recess to which an information terminal is attachable, and FIG. 22C shows an external configuration in which the two information terminals are combined; and FIGS. 23A to 23C are diagrams showing another example of an appearance of a system including two information terminals, FIG. 23A shows a substantially cylindrical information terminal, FIG. 23B shows an information terminal that is attachable on the other information terminal, and FIG. 23C shows an external configuration in which the two information terminals are combined.

DETAILED DESCRIPTION

Figure 2:
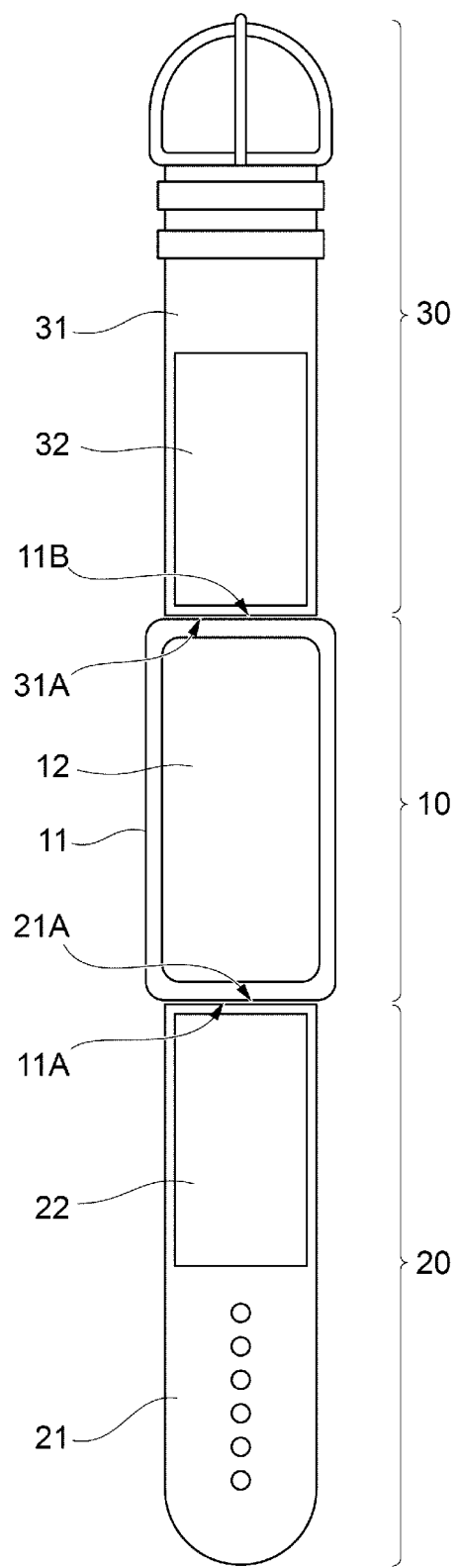
FIG. 2 is a diagram showing one form of a state where the three information terminals are combined with each other.

Exemplary embodiments of the present disclosure will be described below with reference to the accompanying drawings.

Exemplary Embodiment

External Configuration

FIGS. 1A to 1C are diagrams showing examples of appearances of three information terminals 10, 20, and 30 used in an exemplary embodiment.

Each of the information terminals 10, 20, and 30 has functions as a computer. Therefore, the information terminals 10, 20, and 30 can operate independently. The information terminals 10, 20, and 30 may also be coupled to each other for use.

In this sense, the information terminals 10, 20, and 30 are examples of devices that are attached to and detached from other devices for use.

The information terminal 10 has a substantially rectangular parallelepiped body 11. An electronic circuit (not shown) used for information processing is disposed in the body 11. A display module 12 is attached to one surface of the body 11. The display module 12 can process information including an image and a character (hereinafter referred to as "information processing") and display the information. In the present exemplary embodiment, the electronic circuit used for the information processing is disposed in the display module 12. Alternatively, the electronic circuit may be disposed separately from the display module 12.

The information terminal 10 of the present exemplary embodiment uses side surfaces 11A and 11B on short sides of the information terminal 10 for detachable attachment to the information terminals 20 and 30.

The information terminal 10 is attached to and detached from the information terminals 20 and 30 using attachment mechanisms (not shown). For the attachment mechanisms, for example, an attachment bracket, an attachment magnet, or a terminal such as a universal serial bus (USB) interface is used.

When attached to the information terminal 10, the information terminal 20 is used as a tip end side of a belt to be wrapped around a wrist. Therefore, the body 21 is flexible enough to be wrapped around the wrist. The body 21 may only need to be deformable as a belt. Examples of a material of the body 21 include a cloth, a leather, a plastic, a rubber, a sheet, a metal and other materials.

Plural small holes 23 are arranged on a surface of the body 21 on the tip end side. A stick 34 provided on the information terminal 30 is inserted into any of the small holes 23.

A display module 22 is attached to an opposite side of the body 21 to the tip end. The display module 22 can perform information processing on an image and a character and display an image and a character. An electronic circuit (not shown) used for information processing is disposed in the display module 22 of the present exemplary embodiment.

In the present exemplary embodiment, an end surface 21A located on a side of the body 21 where the display module 22 is provided is attached to and detached from the side surface 11A of the information terminal 10.

When attached to the information terminal 10, the information terminal 30 is used as a buckle side of the belt to be wrapped around the wrist. Therefore, a body 31 is also flexible enough to be wrapped around the wrist. A material of the body 31 is the same as that of the body 21.

A display module 32 is attached to an opposite side of the body 31 to a buckle 33. The display module 32 can perform information processing on an image and a character and display an image and a character. An electronic circuit (not shown) used for information processing is disposed in the display module 32 of the present exemplary embodiment.

The stick 34 to be inserted into any of the small holes 23 on an information terminal 20 is attached to the buckle 33 of the body 31. Annular members 35 and 36 into which the tip end of the information terminal 20 is inserted are attached between the buckle 33 of the body 31 and the display module 32.

Here, the member 35 is also called a fixed loop, and is fixed to the body 31. The member 36 is also referred to as a free loop, and is attached so as to be freely movable in a longitudinal direction of the body 31.

In the present exemplary embodiment, an end surface 31A located on a side of the body 31 where the display module 32 is provided is attached to and detached from the side surface 11B of the information terminal 10.

FIG. 2 is a diagram showing one form of a state where the three information terminals 10, 20, and 30 are combined with each other. In FIG. 2, corresponding reference numerals are allocated to elements that correspond to the elements shown in FIGS. 1A to 1C.

As shown in FIG. 2, the information terminal 20 and the information terminal 30 are attached to the information terminal 10 so as to sandwich the information terminal 10 from both sides. As described above, in the present exemplary embodiment, the information terminal 20 and the information terminal 30 may be detached from the information terminal 10.

The three information terminals 10, 20, and 30 in the combined state constitute a so-called smart watch. The smart watch is an example of an information processing system.

Figure 3:
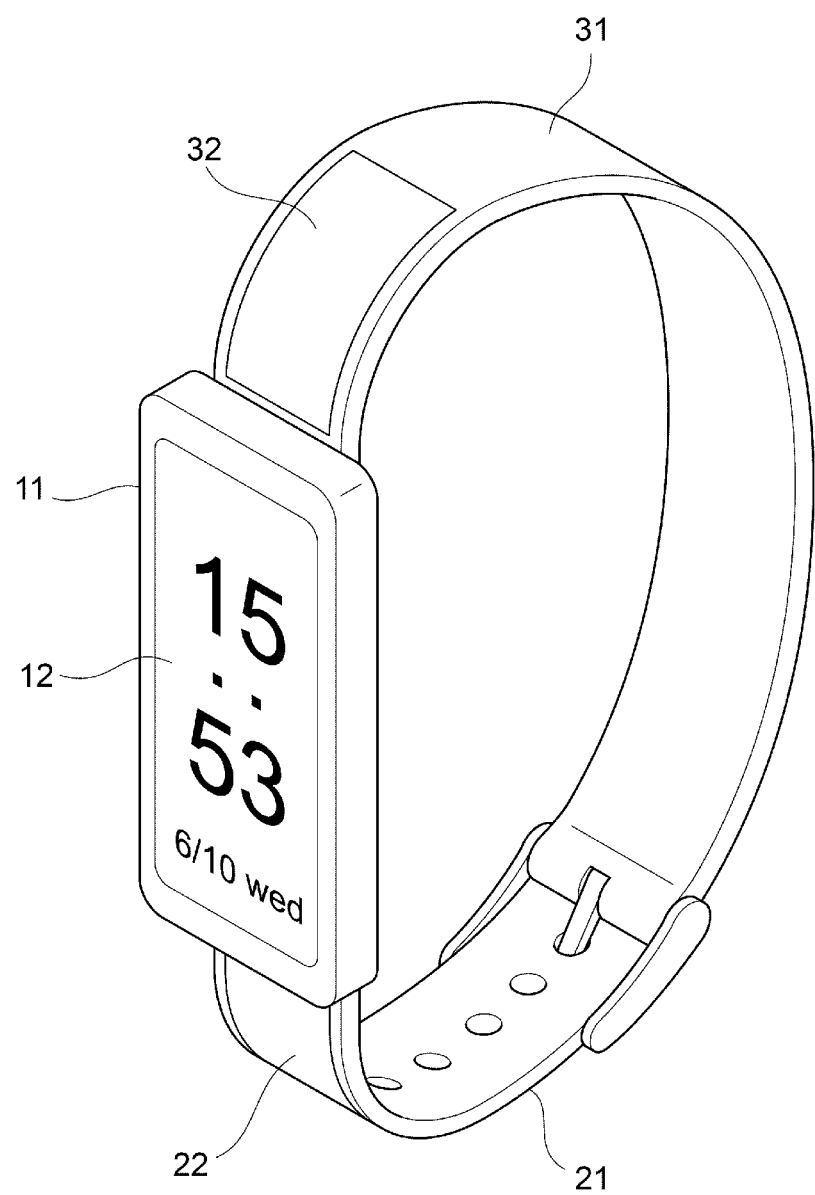
FIG. 3 is a diagram showing a use example in which the three information terminals are combined with each other.

FIG. 3 is a diagram showing a use example in which the three information terminals 10, 20, and 30 are combined with each other. In FIG. 3, corresponding reference numerals are allocated to elements that correspond to the elements shown in FIGS. 1A to 1C.

FIG. 3 omits a wrist on which the information terminals 10, 20, and 30 are worn.

In the present exemplary embodiment, when the three information terminals 10, 20, and 30 are combined, three display modules 12, 22, and 32 are arranged in a line.

Internal Configuration

Figure 4:
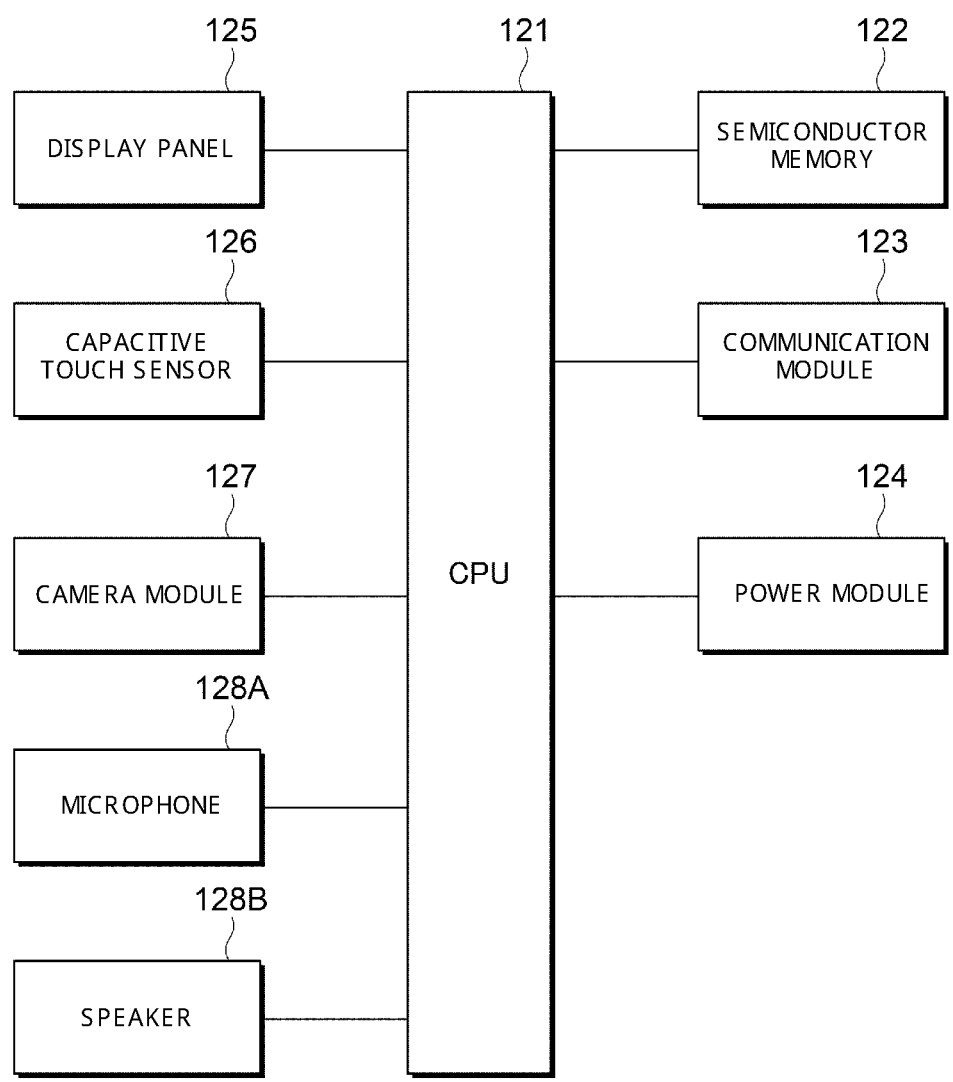
FIG. 4 is a diagram showing an example of an internal configuration of a display module disposed in a middle of three display modules.

FIG. 4 is a diagram showing an example of an internal configuration of the display module 12 disposed in a middle of the three display modules 12, 22 and 32 (see FIGS. 1A to 1C).

The display module 12 provided on the information terminal 10 includes a central processing unit (CPU) 121, a semiconductor memory 122, a communication module 123, a power module 124, a display panel 125, a capacitive touch sensor 126, a camera module 127, a microphone 128A, and a speaker 128B. The CPU 121 controls each unit of the display module 12 through execution of a program (hereinafter referred to as an "app"). The semiconductor memory 122 stores system data and internal data. The communication module 123 is used for communication with an external device. The power module 124 supplies power. Information is displayed on the display panel 125. The capacitive touch sensor 126 is used to detect operation on an operation key displayed on the display panel 125. The microphone 128A is used for a call or a recording. The speaker 128B is used to reproduce sound.

The CPU 121 of the present exemplary embodiment implements various functions through execution of the app stored in the semiconductor memory 122.

The semiconductor memory 122 includes, for example, a random access memory (RAM) and a flash memory.

The CPU 121 and the semiconductor memory 122 constitute a computer. Therefore, the display module 12 can operate independently.

The communication module 123 of the present exemplary embodiment includes both an interface for communicating with a physically connected external device and an interface for communicating with an external device in a non-contact manner Examples of the former interface include a USB interface. Examples of the latter interface include a wireless local area network (LAN) interface.

In the present exemplary embodiment, the information terminal 10 (see FIGS. 1A to 1C) including the display module 12 is assumed to be attached to and detached from the information terminals 20 and 30 (see FIGS. 1A to 1C). It is noted that the information terminal 10 may also be attached to and detached from an external device other than the information terminals 20 and 30.

The power module 124 supplies power to each unit constituting the display module 12. When power supply is requested from both or one of the information terminals 20 and 30 that are electrically connected, the power module 124 supplies power to the information terminals 20 and 30 as an external device.

When a remaining amount of a battery embedded in the information terminal 10 is lower than a predetermined threshold value, the power module 124 can receive the power supply from the information terminals 20 and 30 that are electrically connected.

In the present exemplary embodiment, a physical terminal connection is used to transfer power between the information terminal 10 and the external device. Alternatively, power may be transferred in a wireless manner.

The display panel 125 includes, for example, an organic electro luminescent (EL) display or a liquid crystal display.

The capacitive touch sensor 126 is a film-shaped sensor and is disposed on a surface of the display panel 125. The capacitive touch sensor 126 has a characteristic of not obstructing observation of an image displayed on the display panel 125, and is used to detect a position operated by the user.

For example, a complementary metal oxide semiconductor (CMOS) sensor is used for the camera module 127.

The microphone 128A is a device that converts a voice of a user or an ambient sound into an electric signal.

The speaker 128B is a device that converts an electric signal into a sound to output the sound.

Figure 5:
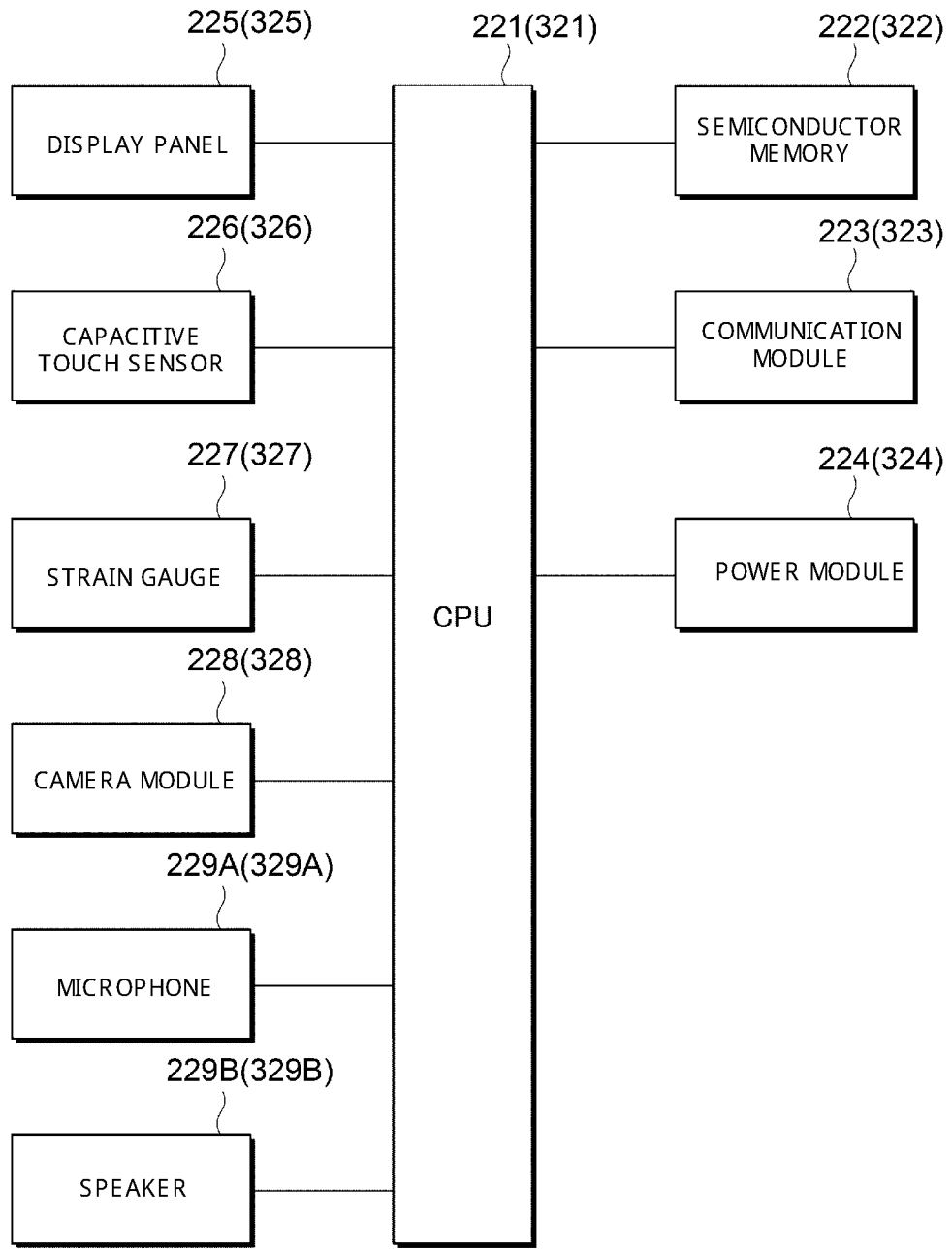
FIG. 5 is a diagram showing an example of an internal configuration of two display modules disposed at both ends of the three display modules.

FIG. 5 is a diagram showing a configuration example of two display modules 22 and 32 disposed at both ends of the three display modules 12, 22, and 32 (see FIGS. 1A to 1C).

The display module 22 provided on the information terminal 20 (see FIGS. 1A to 1C) and the display module 32 provided on the information terminal 30 (see FIGS. 1A to 1C) both have the same internal configuration. Therefore, in the following description, the display module 22 will be described.

The display module 22 provided on the information terminal 20 includes a CPU 221, a semiconductor memory 222, a communication module 223, a power module 224, a display panel 225, a capacitive touch sensor 226, a strain gauge 227, a camera module 228, a microphone 229A, and a speaker 229B. The CPU 221 controls each unit through execution of an app. The semiconductor memory 222 stores system data and internal data. The communication module 223 is used for communication with an external device. The power module 224 supplies power. Information is displayed on the display panel 225. The capacitive touch sensor 226 is used to detect operation on an operation key displayed on the display panel 225. The strain gauge 227 detects deformation of the body 21 (see FIGS. 1A to 1C). The microphone 229A is used for a call or a recording. The speaker 229B that is used to reproduce sound.

The CPU 221 of the present exemplary embodiment implements various functions through execution of the app stored in the semiconductor memory 222.

The semiconductor memory 222 includes, for example, a RAM and a flash memory.

The CPU 221 and the semiconductor memory 222 constitute a computer. Therefore, the display module 22 can operate independently.

In the present exemplary embodiment, the communication module 223 includes both an interface for communicating with a physically connected external device and an interface for communicating with an external device in a non-contact manner.

For example, a USB interface and a wireless LAN interface are also used for the communication module 223.

In the present exemplary embodiment, the information terminal 20 including the display module 22 is assumed to be attached to and detached from the information terminal 10. It is noted that the information terminal 20 may also be attached to and detached from an external device other than the information terminal 10.

The power module 224 supplies power to each unit constituting the display module 22. When power supply is requested from the information terminals 10 that is electrically connected, the power module 224 supplies power to the information terminals 10 as the external device.

When a remaining amount of a battery embedded in the information terminal 20 is lower than the predetermined threshold value, the power module 224 can receive the power supply from the information terminals 10 and 30 that are electrically connected.

Transfer of power by a physical terminal connection and transfer of power in a wireless manner are also used for transfer of power between the power module 224 and the external device.

The display panel 225 includes, for example, an organic EL display or a liquid crystal display.

The capacitive touch sensor 226 is a film-shaped sensor and is disposed on a surface of the display panel 225. The capacitive touch sensor 226 has a characteristic of not obstructing observation of an image displayed on the display panel 225, and is used to detect a position operated by the user.

One or more strain gauges 227 are arranged along a longitudinal direction of the body 21 (see FIGS. 1A to 1C). The strain gauge 227 has a structure in which a resistor of a metal arranged in a zigzag shape is attached on a thin insulator. The strain gauge 227 measures a change in resistance caused by deformation of the resistor, and converts the change in resistance into a strain amount of an object to be measured. The strain gauge 227 is an example of a mechanical sensor.

The CPU 221 of the present exemplary embodiment estimates a shape of the display panel 225 after bending deformation based on a distribution of information on a magnitude of strain output from the strain gauge 227, and sets an information display region on the display panel 225. For example, when the display panel 225 is not deformed, or when the display panel 225 is deformed but is little curved, the entire display panel 225 is set to a display region. On the other hand, when the deformation curves the display panel 225 largely, a part of the display panel 225 is set to the display region. When the display panel 225 is more curved, the region used in display on the display panel 225 becomes smaller.

A part of the display panel 225 near an end surface 21A attached to the information terminal 10 (see FIGS. 1A to 1C) is always included in the display region. In other words, parts of the display panel 225 are excluded from the display region in order from the part farthest from the information terminal 10. This is because when the display panel 225 is curved greatly, it becomes difficult for the user who wears the smart watch to observe.

For example, the CMOS sensor is used for the camera module 228.

The microphone 229A is a device that converts a voice of a user or an ambient sound into an electric signal.

The speaker 229B is a device that converts an electric signal into a sound to output the sound.

Processing Operation

Processing Operation Executed by Each Information Terminal

Figure 6:
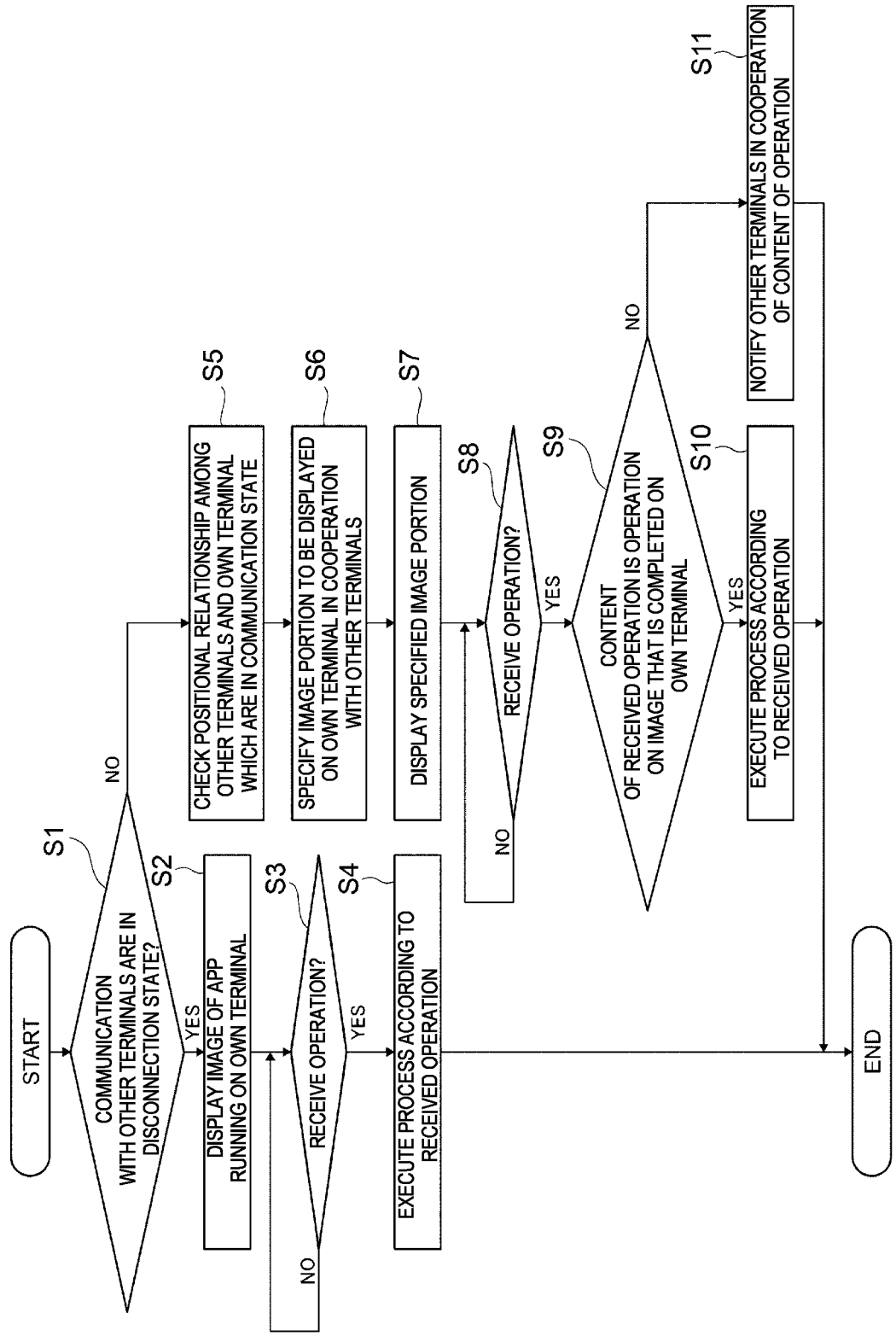
FIG. 6 is a flowchart showing an example of processing operation executed by the three information terminals used in the exemplary embodiment.

FIG. 6 is a flowchart showing an example of processing operation executed by the three information terminals 10, 20, and 30 (see FIGS. 1A to 1C) used in the exemplary embodiment. A symbol "S" shown in the figure refers to a "step".

The processing operation shown in FIG. 6 is executed in each of the CPU 121 (see FIG. 4), the CPU 221 (see FIG. 5), and the CPU 321 (see FIG. 5). Hereinafter, the CPUs 121, 221, and 321 are collectively referred to as a CPU.

An active CPU determines whether communication with other information terminals (hereinafter, referred to as "other terminals") is in a disconnection state (step 1).

In the present exemplary embodiment, a state where communication is established (hereinafter referred to as a "communication state") and a state where communication is disconnected (hereinafter referred to as "disconnection state") are irrelevant to physical attachment among the information terminals 10, 20, and 30.

Therefore, even when the three information terminals 10, 20, and 30 are attached to each other to constitute an appearance of the smart watch shown in FIGS. 2 and 3, the three CPUs are not necessarily in the communication state.

On the other hand, even when the three information terminals 10, 20, and 30 are physically separated as shown in FIGS. 1A to 1C, if a wireless connection is established, the three CPUs are in the communication state. For example, pairing is used to establish the wireless connection.

FIG. 7 is a diagram showing an example of a communication pattern among the three information terminals 10, 20, and 30. FIG. 7 shows four communication patterns.

A pattern 1 is a pattern in which all of the three information terminals 10, 20, and 30 are in the communication state. Patterns 2 to 4 are patterns in which any two of the three information terminals 10, 20, and 30 are in the communication state.

The information terminal in the disconnection state does not communicate with other information terminals, but may operate independently.

The description returns to FIG. 6.

When the information terminal does not communicate with other terminals, the CPU obtains an affirmative result in the step 1. In this case, the CPU displays an image of an app running on the own terminal (step 2). Content of the displayed image depends on the running app.

After the step 2, the CPU determines whether operation is received (step 3). In the present exemplary embodiment, during a period in which a negative result is obtained in the step 3, the CPU repeats the determination in the step 3.

On the other hand, when the affirmative result is obtained in the step 3, the CPU executes a process according to the received operation (step 4). For example, when a volume button is operated while a television image is being displayed, the CPU increases or decreases a volume according to the received operation.

FIG. 8 is a diagram showing a display example of the three information terminals 10, 20, and 30 in a state where the communication is disconnected.

In the case of FIG. 8, a text document is displayed on the display module 12. A time is displayed on the display module 22. A telephone icon and a mail icon are displayed on the display module 32.

In the example of FIG. 8, different images are displayed on the display modules 12, 22 and 32. However, the corresponding information terminals 10, 20, and 30 are not communicating with each other, the same images may be displayed on the display modules 12, 22, and 32.

Figure 9:
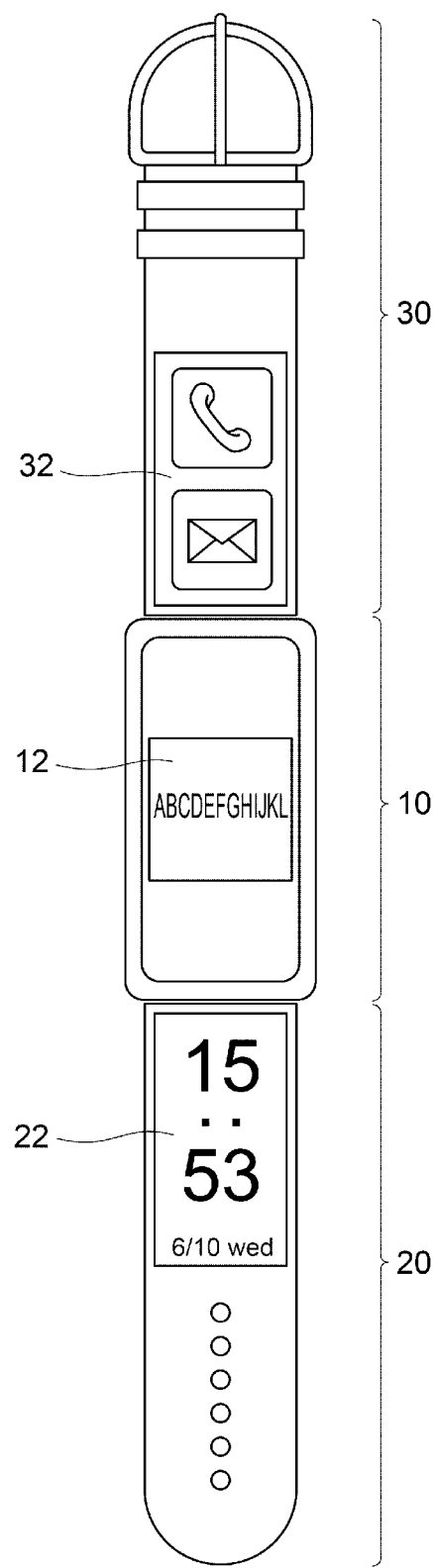
FIG. 9 is a diagram showing another display example of the three information terminals in the state where the communication is disconnected.

FIG. 9 is a diagram showing another display example of the three information terminals 10, 20, and 30 in the state where the communication is disconnected. In FIG. 9, corresponding reference numerals are allocated to elements that correspond to the elements shown in FIG. 8.

In the case of FIG. 9, the three information terminals 10, 20, and 30 are coupled to each other to constitute a smart watch.

It is noted that in the case of FIG. 9, the information terminals 10, 20, and 30 operate independently. Therefore, different images are displayed on the display modules 12, 22, and 32. Since the information terminals 10, 20, and 30 operate independently, the same image may also be displayed on the information terminals 10, 20, and 30.

The description returns to FIG. 6.

When it is determined in the step 1 that the own terminal is in communication with another terminal, the CPU obtains the negative result in the step 1.

When the negative result is obtained in the step 1, the CPU checks a positional relationship between the other terminals and the own terminal which are in the communication state (step 5). For example, the CPU checks whether the other terminal in the communication state is located next to the own terminal.

For example, when there is one other terminal in the communication state and the other terminal is not attached to the own terminal, the CPU checks whether the own terminal and the other terminal are coupled to the information terminal 10 that is not in communication with the own terminal.

When the own terminal and the other terminal are coupled to the information terminal 10, the CPU recognizes that the own terminal and the other terminal, which are in the communication state, are used as a part of the smart watch.

On the other hand, when the own terminal and the other terminal are not coupled to the information terminal 10, the CPU recognizes that the own terminal and the other terminal are used in a separated state.

When the CPUs of the three information terminals 10, 20, and 30 are in the communication state, the CPU checks whether the three information terminals 10, 20, and 30 are coupled to each other.

When the three information terminals 10, 20, and 30 are coupled to each other, the CPU recognizes that the own terminal and other terminals are used as a part of the smart watch.

On the other hand, when the three information terminals 10, 20, and 30 are not coupled to each other, the CPU recognizes that the own terminal and other terminals are used in the separated state.

When the positional relationship among the own terminal and the other terminals is determined, the CPU specifies an image portion to be displayed on the own terminal in cooperation with the other terminals (step 6).

In the present exemplary embodiment, the user instructs content and allocation of an image to be displayed on the entirety of the two or three information terminals, which are in the communication state. Alternatively, the content and allocation of the image may be determined in advance according to the positional relationship among the information terminals which are in the communication state.

For example, when one image is divided into sub-images and the sub-images are displayed on the own terminal and other terminals, the CPU specifies an image portion displayed on the own terminal.

In the present exemplary embodiment, when sizes of plural display panels to which one image is allocated are different, the image portions to be allocated to the individual display panels are specified in a state where widths of the image displayed on the plural display panels are aligned in a height direction. In this case, sizes of the characters and image on display can be aligned among the own terminal and the other terminals. As a result, continuity of the image displayed on the plural display panels is ensured, and the image may be easily observed.

For example, when plural images related to each other is allocated to the own terminal and the other terminals, the CPU specifies the image portion displayed on the own terminal.

After the step 6, the CPU displays the specified image portion (step 7).

Prior to specifying the image to be displayed, the CPUs of the information terminals 10, 20, and 30 share information on the display regions in the display modules 12, 22, and 32. In the present exemplary embodiment, a region in which an image is displayed on the display panel of each information terminal varies depending on a thickness of the worn wrist.

The CPU of each of the information terminals 10, 20, and 30 regards the entirety of the three display regions at a time of display as one display surface, and specifies the image portion corresponding to the own terminal.

Figure 10:
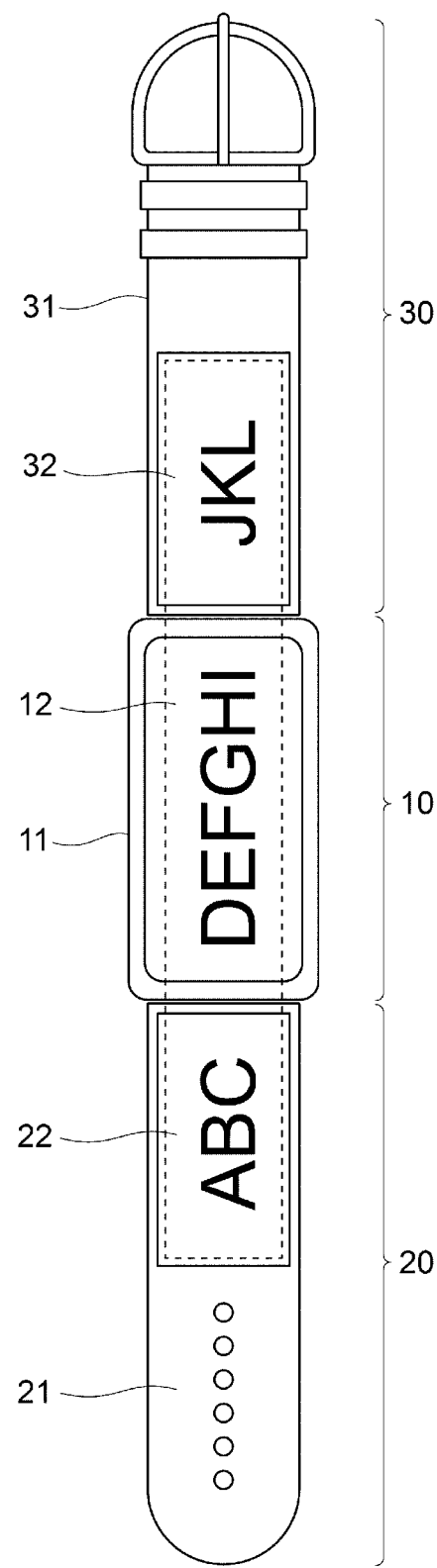
FIG. 10 is a diagram showing an example in which one image is displayed using the three information terminals.

FIG. 10 is a diagram showing an example in which one image is displayed using the three information terminals 10, 20, and 30.

The example shown in FIG. 10 represents an example in which a text document "ABCDEFGHIJKL" is divided into sub-text documents and the sub-text documents are allocated to the three display modules 12, 22 and 32. Specifically, "ABC" is displayed on the display module 22, "DEFGHI" is displayed on the display module 12, and "JKL" is displayed on the display module 32.

A region surrounded by a broken line represents an image before division. A height is matched among the three display modules 12, 22, and 32. When the height is not adjusted, font sizes of the characters displayed on the display modules 22 and 32 are smaller than a font size of the characters displayed on the display module 12, and the continuity of the display would be impaired.

Figure 11:
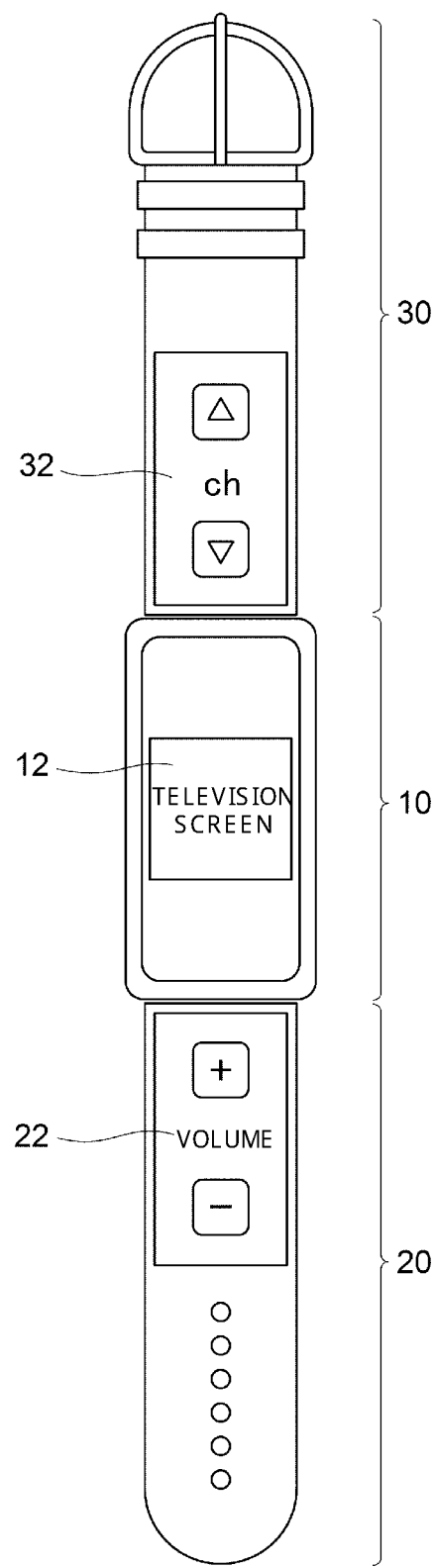
FIG. 11 is a diagram showing an example in which images related to each other are allocated to the three information terminals.

FIG. 11 is a diagram showing an example in which images related to each other are allocated to the three information terminals 10, 20, and 30.

In the case of FIG. 11, a television screen is displayed on the display module 12 of the information terminal 10 located in a middle of the three information terminals 10, 20, and 30, and a screen used to operate the television screen is displayed on the display modules 22 and 32 of the remaining two information terminals 20 and 30.

Specifically, a screen used to adjust a volume is displayed on the display module 22 of the information terminal 20, and a screen used to select a channel is displayed on the display module 32 of the information terminal 30.

Here, the television screen is an example of an image to be operated, and the screen used to adjust a volume and the screen used to select a channel are examples of an image related to operation.

Figure 12:
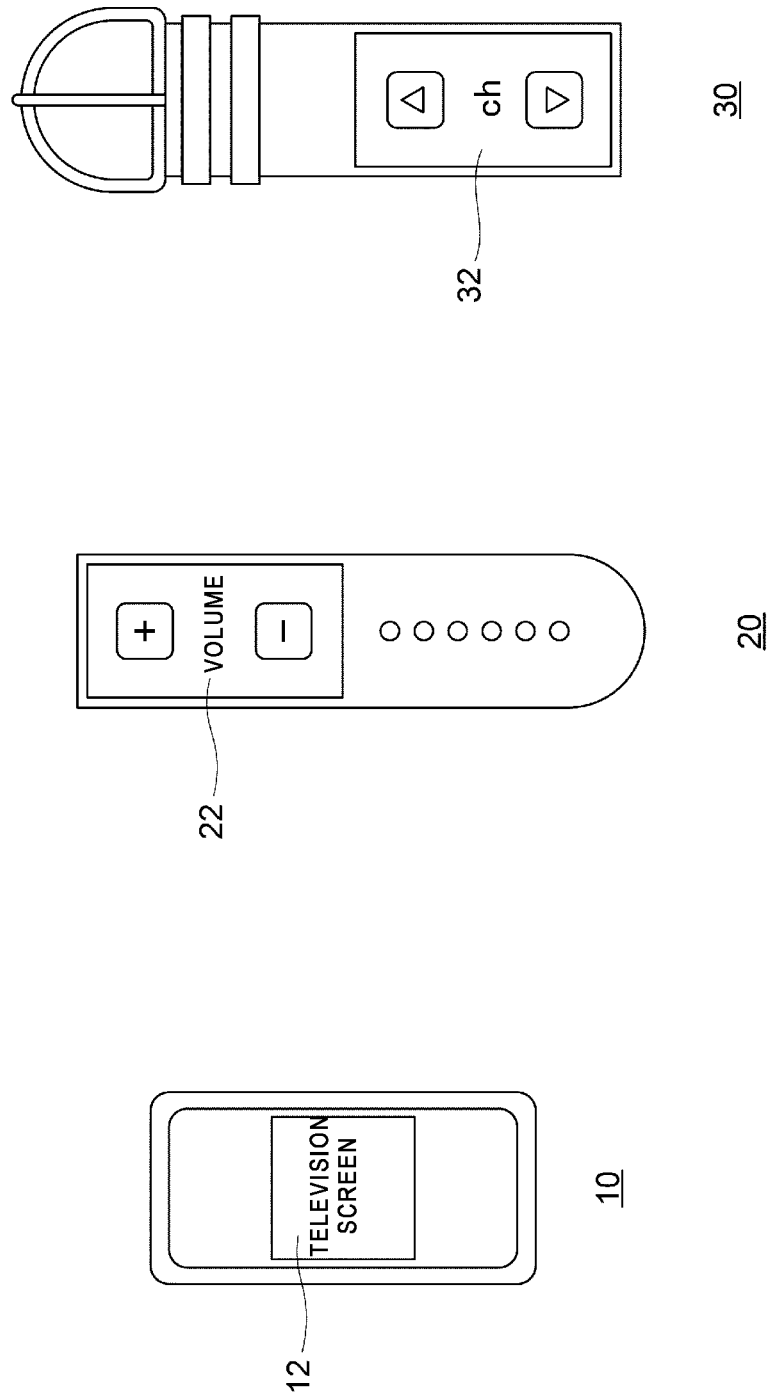
FIG. 12 is a diagram showing another example in which images related to each other are allocated to the three information terminals.

FIG. 12 is a diagram showing another example in which images related to each other are allocated to the three information terminals 10, 20, and 30. In FIG. 12, corresponding reference numerals are allocated to elements that correspond to the elements shown in FIG. 11.

In the case of FIG. 12, the three information terminals 10, 20, and 30 are in a separated state, and do not constitute the smart watch unlike the case of FIG. 11. It is noted that the three information terminals 10, 20, and 30 are in the communication state.

Therefore, a television screen is displayed on the display module 12 of the information terminal 10, and screens used to operate the television screen is displayed on the display modules 22 and 32 of the remaining two information terminals 20 and 30.

Figure 13:
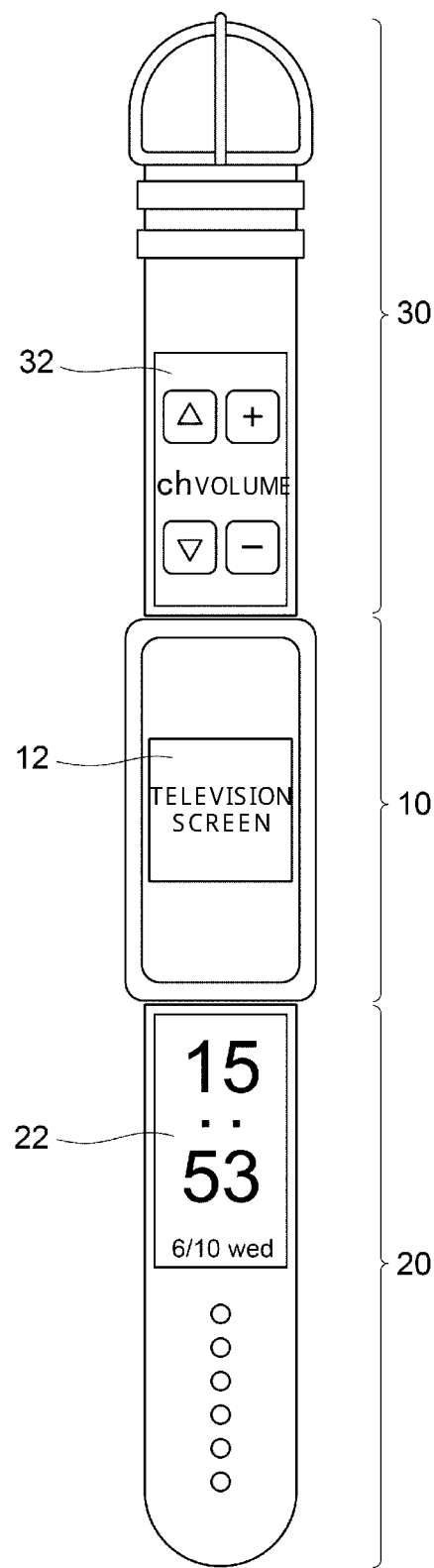
FIG. 13 is a diagram showing an example in which images related to each other are allocated to two information terminals in a communication state.

FIG. 13 is a diagram showing an example in which images related to each other are allocated to two information terminals 10 and 30, which are in the communication state.

In the case of FIG. 13, the television screen is displayed on the display module 12 of the information terminal 10 located in the middle of the three information terminals, and the screen used to operate the television screen is displayed on the display module 32 of the information terminal 30 which is in communication with the information terminal 10. Specifically, the screen including an image used to adjust a volume and the image used to select a channel are displayed on the display module 32 of the information terminal 30.

Here, the television screen is an example of an image to be operated. The screen including the image used to adjust a volume and the image used to select a channel is an example of an image related to operation.

A time screen is displayed on the display module 22 in the state where communication is disconnected.

In the present exemplary embodiment, it is premised on that the smart watch is completed by combining the information terminals 10, 20, and 30. The information terminals 10, 20, and 30 may be in communication with an unknown information terminal. In such a case, each CPU collects or exchanges information such as topology of each communication node, a size of a device corresponding to each communication node, a size of a display panel provided in each device, and specifies an image to be displayed on information terminals which are in the communication state.

The description returns to FIG. 6.

After the step 7, the CPU determines whether operation is received (step 8). In the present exemplary embodiment, during a period in which a negative result is obtained in the step 8, the CPU repeats a determination in the step 8.

On the other hand, when an affirmative result is obtained in the step 8, the CPU determines whether content of the received operation is operation on an image that is completed in the own terminal (step 9).

When the affirmative result is obtained in the step 9, the CPU executes processing according to the received operation (step 10).

On the other hand, when the negative result is obtained in the step 9, the CPU notifies other terminals in cooperation of the content of the operation (step 11).

FIGS. 14A and 14B are diagrams showing a change in display when user operation is completed on the own terminal. FIG. 14A shows display before the change, and FIG. 14B shows display after the change.

FIGS. 14A and 14B show a display example when the affirmative result is obtained in the step 9 (see FIG. 6).

In the case of FIG. 14A, the user operates the display module 32 on which the screen used to select a channel is displayed.

It is noted that a purpose of the user to operate the display module 32 is not a selection of a channel but a change in a button layout. Therefore, the user taps a region other than a channel selection button, twice. In FIGS. 14A and 14B, a layout in which the channel selection buttons are vertically arranged is changed to a layout in which the channel selection buttons are horizontally arranged.

Figure 15A:
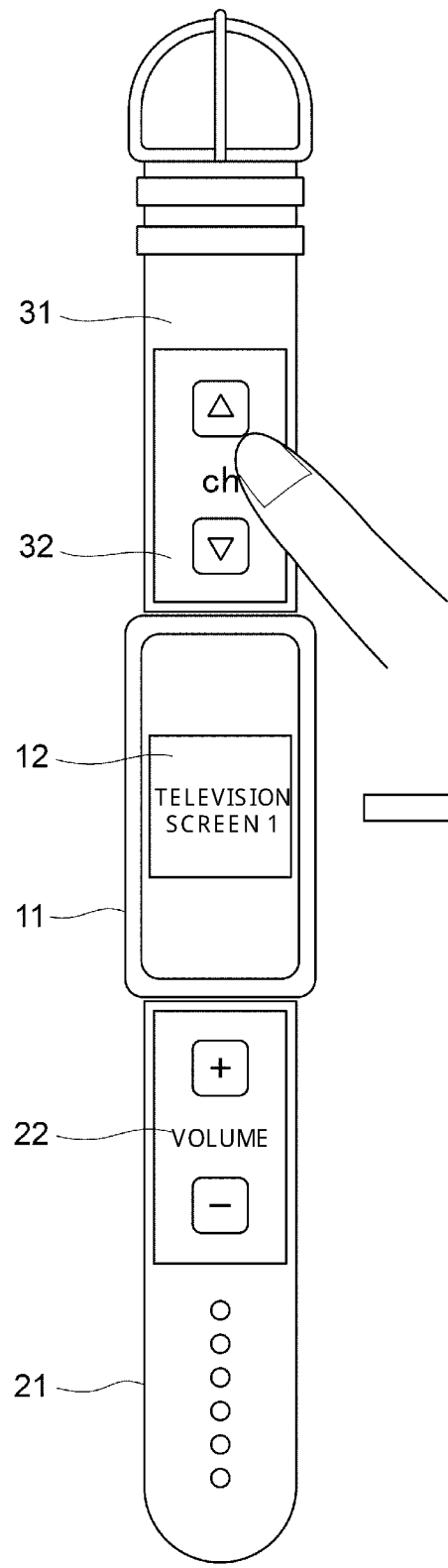
FIGS. 15A and 15B are diagrams showing a change in display when the user operation is related to display of another terminal.
Figure 15B:
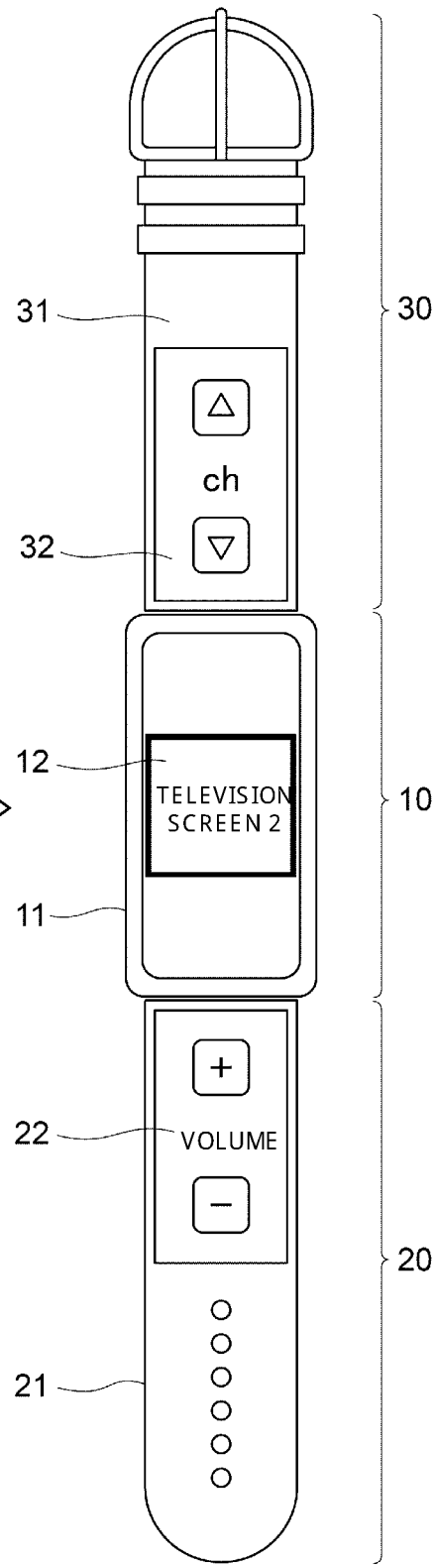

FIGS. 15A and 15B are diagrams showing a change in display when the user operation is related to display of the other terminal. FIG. 15A shows display before the change, and FIG. 15B shows display after the change.

FIGS. 15A and 15B show a display example when the negative result is obtained in the step 9 (see FIG. 6).

In the case of FIG. 15A, the user operates the channel selection buttons displayed on the display module 32. Therefore, in FIGS. 15A and 15B, a "television screen 1" displayed on the display module 12 is changed to a "television screen 2".

Setting of Display Region

Next, processing operation when the display region on each information terminal is changed will be described.

FIG. 16 is a flowchart showing an example of the processing operation used by the three information terminals 10, 20, and 30 (see FIGS. 1A to 1C) used in the exemplary embodiment to set the display region. A symbol "S" shown in the figure refers to a "step".

The processing operation shown in FIG. 16 is executed in parallel with the processing operation shown in FIG. 6. In the present exemplary embodiment, since the display module 12 of the information terminal 10 (see FIGS. 1A to 1C) is not deformed, the processing operation shown in FIG. 16 is executed by the CPUs of the information terminals 20 and 30.

First, the CPU determines whether a display panel of the own terminal is curved due to deformation (step 21). This is because when the display panel is curved greatly, it becomes difficult to observe the entire display panel.

When an affirmative result is obtained in the step 21, the CPU sets a region used in display on the display panel according to a degree at which the display panel is curved (step 22).

On the other hand, when a negative result is obtained in the step 21, the CPU sets the entire display panel to the region used in display (step 23).

Figure 17A:
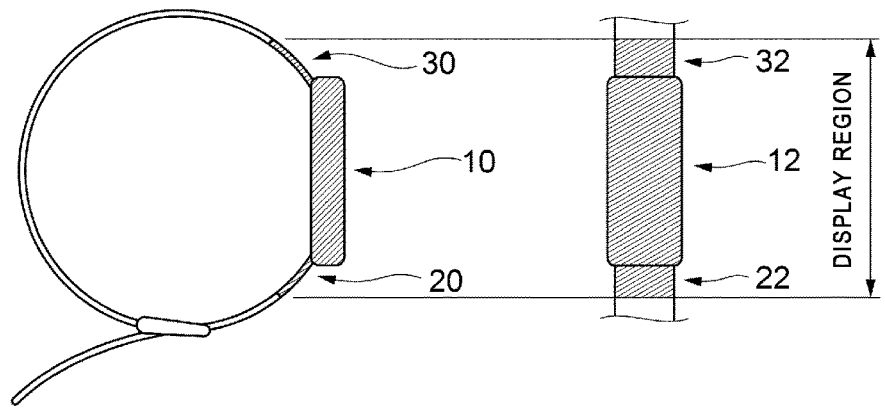
FIGS. 17A to 17C are diagrams showing an example in which the display region is changed according to a thickness of a wrist on which a smart watch is worn.
Figure 17B:
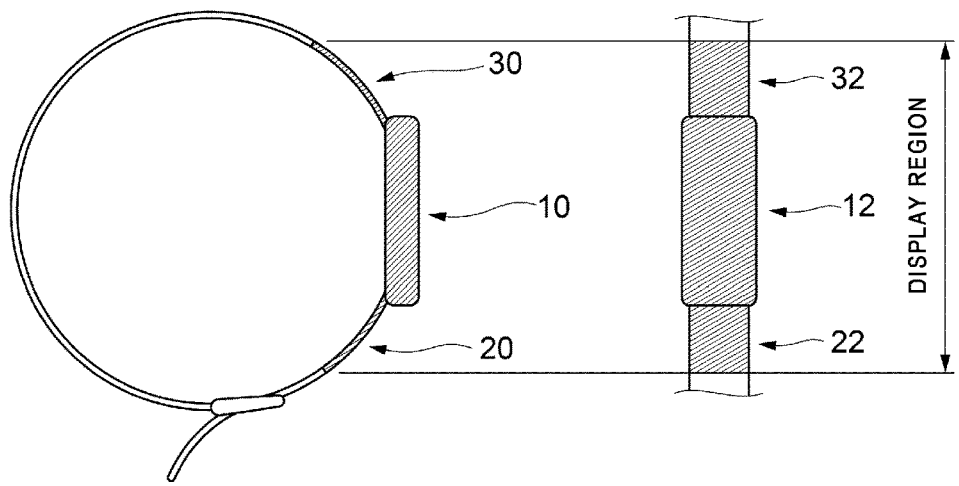
Figure 17C:
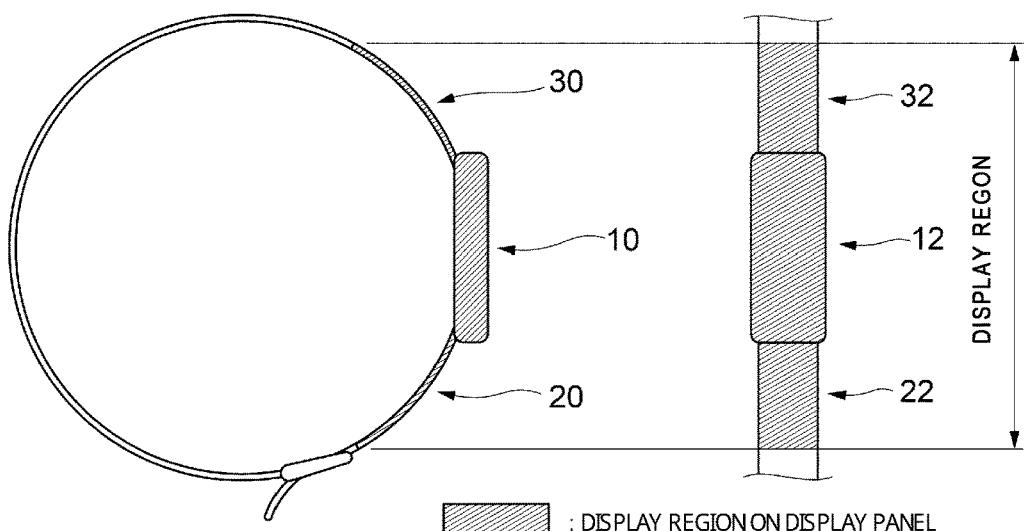

FIGS. 17A to 17C are diagrams showing an example in which the display region is changed according to a thickness of the wrist on which the smart watch is worn. FIG. 17A shows an example of the display region when the wrist is thin. FIG. 17B shows an example of the display region when the wrist has a medium thickness. FIG. 17C shows an example of the display region when the wrist is thick.

Left parts of FIGS. 17A to 17C are side views showing the three information terminals 10, 20, and 30 used as a smart watch. Right parts of FIGS. 17A to 17C show the display regions set for the display modules 12, 22, and 32 corresponding to the three information terminals 10, 20, and 30.

When the wrist is thin, the information terminals 20 and 30 are curved greatly. Therefore, regions on the display modules 22 and 32 far from the information terminal 10 is likely to be a blind spot as seen from the user. Therefore, even when an image is displayed in this region, the image is not observed by the user. Therefore, in the display modules 22 and 32, the region used in display is limited to a part of the region that can be used for display.

On the other hand, when the wrist is thick, the information terminals 20 and 30 is curved little. In the case of FIG. 17, the entirety of the display modules 22 and 32 are set to the display region.

When the wrist has the medium thickness, the display region has an intermediate size between the display region in FIG. 17A and the display region in FIG. 17C.

It is noted that FIGS. 17A and 17B are examples of setting in the step 22 (see FIG. 16), and FIG. 17C is an example of the setting in the step 23 (see FIG. 16).

In the step 6 (see FIG. 6) described above, the image portion to be displayed on each of the information terminals 10, 20, and 30 is specified according to the setting.

FIGS. 18A to 18E are diagrams showing a change in display content with a change in the display region. FIG. 18A shows a state where an image can be displayed on the entire display module 32. FIGS. 18B and 18D show a state where a displayable region on the display module 32 is narrower than that in FIG. 18A. FIGS. 18C and 18E show a state where a displayable region on the display module 32 is further narrower than that in FIGS. 18B and 18D.

In the case of FIG. 18A which is in an initial state, a telephone icon and a mail icon are displayed in a full size on the display module 32.

In the case of FIG. 18B where the display region is narrower than that in FIG. 18A, sizes of the icons are reduced for display on the display module 32. However, a layout in which the icons are arranged in two rows is maintained.

In the case of FIG. 18C where the display region is further narrower than that in FIG. 18B, the sizes of the icons remain the same as those in the display module 32, but the layout is changed so that the two icons are arranged in one row.

When the display region in FIG. 18D is the same as that in FIG. 18B, the displayed icon is only the mail icon, and the telephone icon is removed.

When the display region in FIG. 18C is the same as that in FIG. 18E, the size of the displayed icon is reduced.

In this manner, the content and layout of the image displayed on the display module 32 are changed according to the change in the display region.

In the example in FIGS. 18A to 18E, influence of the change of the display region is completed in one information terminal 30. However, when one image is displayed on the display modules of the plural information terminals including, for example, the information terminal 30, the content of the image allocated to each display module is changed as the display region is changed.

For example, in the display example of FIG. 10, the entire size used for displaying the text document is reduced due to narrowing of the display regions on the display modules 22 and 32. Therefore, for example, "AB" is displayed on the display module 22, "CDEFGHIJ" is displayed on the display module 12, and "KL" is displayed on the display module 32. At this time, the font size may also be reduced.

Power Interchange

Next, processing operation when the display region on each information terminal is changed will be described.

FIG. 19 is a flowchart showing an example of processing operation used by the three information terminals 10, 20, and 30 used in the exemplary embodiment to interchange power. A symbol "S" shown in the figure refers to a "step".

The processing operation shown in FIG. 19 is executed in parallel with the processing operation shown in FIG. 6 and the processing operation shown in FIG. 16. The processing operation shown in FIG. 19 is executed by each of the three information terminals 10, 20, and 30.

First, the CPU acquires the remaining amount of the battery of the own terminal (step 31). The remaining amount of the battery is acquired from the power module 124 (see FIG. 4).

Next, the CPU determines whether the acquired remaining amount is equal to or less than the threshold value (step 32).

When an affirmative result is obtained in the step 32, the CPU requests other terminals to interchange power (step 33).

Subsequently, the CPU determines whether power interchange is difficult based on a response from other terminals (step 34).

When the power can be interchanged, the CPU obtains a negative result in the step 34 and prepares for a next process.

When the power interchange is difficult, the CPU obtains an affirmative result in the step 34 and changes an operation mode to a power saving mode (step 35). In the power saving mode, display brightness is reduced and a processing speed is reduced. Alternatively, it is also possible to maintain the current operation mode without shifting to the power saving mode so long as the power is supplied.

On the other hand, when the remaining amount of the battery exceeds the threshold value, the CPU obtains the negative result in the step 32. In this case, the CPU determines whether the power interchange is requested from another terminal (step 36).

When the negative result is obtained in the step 36, the CPU prepares for the next process. On the other hand, when the affirmative result is obtained in the step 36, the CPU starts supplying power to the other terminal (step 37). Power may be supplied directly to another terminal in which power is insufficient. Power may also be supplied via another terminal in which power is insufficient to still another terminal. Furthermore, power may be supplied via another terminal which have extra power to still another terminal.

Figure 20:
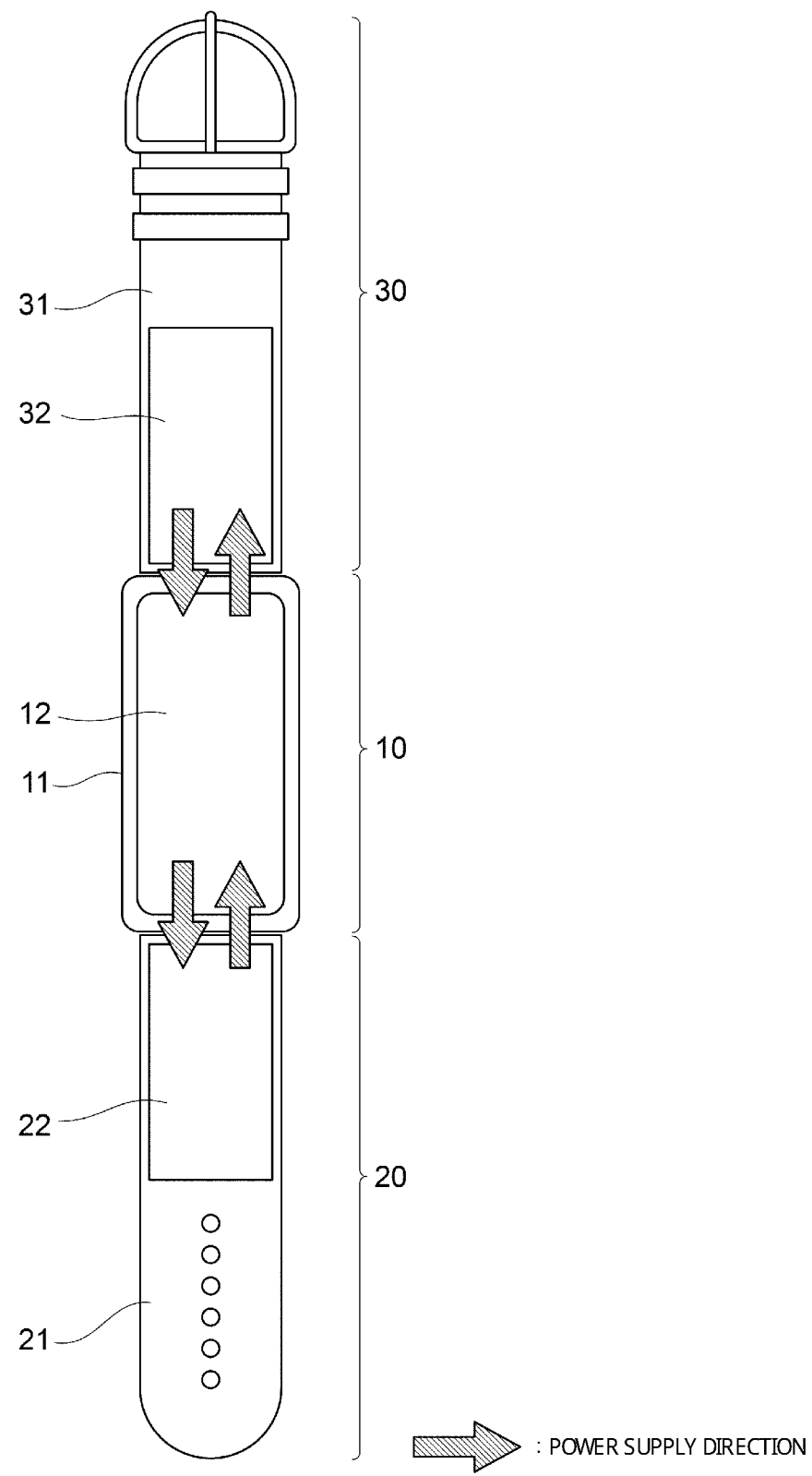
FIG. 20 is a diagram showing power supply among the three information terminals.

FIG. 20 is a diagram showing the supply of power among the three information terminals 10, 20, and 30. In the case of FIG. 20, the information terminal 10 interchanges (supplies and receives) power to and from the adjacent information terminals 20 and 30.

It is noted that it is possible for the information terminal 20 to supply power to the information terminal 30 via the information terminal 10 and it is also possible for the information terminal 30 to supply power to the information terminal 20 via the information terminal 10.

In the above description of the processing operation, each information terminal performs a process related to the power interchange based on the remaining amount of the own battery. Alternatively, each information terminal may notify the other information terminals of the remaining amount of the own battery. In this case, each information terminal may compare, for example, the remaining amounts of the respective information terminals, and instruct an information terminal having a battery with a large remaining amount to supply power to an information terminal having a battery with a small remaining amount. As a result, the power supply in the entire system is controlled.

Another Exemplary Embodiment

The exemplary embodiment of the present disclosure has been described above. It is noted that the technical scope of the present disclosure is not limited to that described in the above exemplary embodiment. It is clear from the recitation of claims that various modifications or improvements that are made in the exemplary embodiment described above are also included in the technical scope of the present disclosure.

(1) For example, in the exemplary embodiment described above, the case where the information terminals 20 and 30 (see FIGS. 1A to 1C) are attached to the information terminal 10 (see FIGS. 1A to 1C) having the substantially rectangular parallelepiped body 11 (see FIGS. 1A to 1C) is described. It is noted that information terminals to be combined are not limited to this example.

FIGS. 21A to 21D are diagrams showing another appearance example of a smart watch including three information terminals 20, 30, and 40. FIG. 21A shows the information terminal 40 having a substantially cylindrical body 41 and a circular display module 42. FIG. 21B shows the information terminal 20 corresponding to a belt on a tip end side. FIG. 21C shows the information terminal 30 corresponding to a belt on a buckle side. FIG. 21D shows an external configuration in which the three information terminals 20, 30 and 40 are combined.

In the case of FIGS. 21A to 21D, instead of the information terminal 10, the information terminal 40 is combined with the information terminals 20 and 30 to constitute the smart watch. When the information terminal 40 is combined, the three information terminals 20, 30 and 40, which have become communicable because of being attached to each other, cooperate with each other, and images allocated to the respective display modules 22, 32 and 42 are displayed.

In the case of FIGS. 21A to 21D, a moving image app is displayed on the display module 42 located in a middle of three display modules 22, 32, and 42. Buttons for adjusting a volume and buttons related to reproduction are displayed on the display modules 22 and 32 located on both sides of the display module 42. In FIGS. 21A to 21D, a play button and a pause button are displayed as the buttons related to reproduction.

(2) In the exemplary embodiment described above, the case where the three information terminals 10, 20, and 30 (see FIGS. 1A to 1C) are combined to constitute the smart watch is described. It is noted that the number of information terminals to be combined is not limited to three.

FIGS. 22A to 22C are diagrams showing an appearance example of a smart watch including two information terminals 10 and 50. FIG. 22A shows the information terminal 10 that is attachable to a recess. FIG. 22B shows the other information terminal 50 that has a recess to which the information terminal 10 is attachable. FIG. 22C shows an external configuration in which the two information terminals 10 and 50 are combined.

In the information terminal 50 shown in FIGS. 22B and 22C, belts 52 and 53 are attached to a body 51.

A recess 51A to which the information terminal 10 is to be fitted is provided in the body 51.

A deformable display module 52A is provided on the belt 52 on a tip end side. A deformable display module 53A is provided on the belt 53 on a buckle side.

Strain gauges (not shown) are attached to an outer periphery or a lower portion of the display modules 52A and 53A.

The electronic circuit described with reference to FIG. 5 is provided in the body 51. Alternatively, the electronic circuit described with reference to FIG. 5 may be provided in any one of the display modules 52A and 53A. Further alternatively, the electronic circuit may be disposed in a distributed manner in the body 51, the display module 52A, and the display module 53A.

In the case of FIGS. 22A to 22C, a pattern is drawn on the body 51 of the information terminal 10. Therefore, a user may enjoy changing an appearance of the smartwatch by fitting the information terminal 10 on which a different pattern is drawn in the body 51 into the information terminal 50.

Conversely, plural information terminals 50 having different appearances may be prepared. In this case, the user may enjoy changing the appearance of the smartwatch by changing the information terminal 50 into which the information terminal 10 is fitted.

(3) In the exemplary embodiment described above, the case where the smart watch is constituted by combining the plural information terminals is described. It is noted that an article constituted by combination is not limited to the smart watch.

FIGS. 23A to 23C are diagrams showing another example of an appearance of a system including two information terminals. FIG. 23A shows a substantially cylindrical information terminal 60. FIG. 23B shows an information terminal 70 that is attachable to the other information terminal 60. FIG. 23C shows an external configuration in which the two information terminals 60 and 70 are combined.

A display module 62 is attached to a body 61 of the information terminal 60. An electronic circuit that executes information processing is disposed in the display module 62.

A display module 72 and an attachment bracket 73 are attached to a body 71 of the information terminal 70. An electronic circuit that executes information processing is also disposed in the display module 72.

The information terminal 60 and the information terminal 70 shown in FIGS. 23A to 23C are brought into a communication state by attaching the information terminal 60 and the information terminal 70 to each other. An image of a moving image app is displayed on the display module 62. Buttons for adjusting a volume are displayed on the display module 72.

With this arrangement of the images, the user may adjust the volume with unobstructed viewing of the image of the moving image app. Naturally, the information terminal 60 and the information terminal 70 can operate independently.

It is also possible to constitute another article. For example, a wearable terminal such as a bracelet, a hair clip, an earring, or a smart glass, a medical device such as a blood pressure manometer or a pedometer, or a game machine may be constituted.

(4) In the exemplary embodiment described above, it is assumed that a wearable device in which the plural information terminals are combined is worn on a wrist. The position on which the wearable device is worn may be anywhere, such as an upper arm, an ankle, a thigh, a neck, a torso, and a head. An object on which the wearable device is worn (attached) is not limited to a person, and may be an animal such as a dog or a cat.

(5) In the exemplary embodiment described above, the case where the information terminal 10 located in the middle of the three information terminals 10, 20, and 30 (see FIGS. 1A to 1C) is not deformed is described. It is noted that all of the information terminals to be combined may be deformable.

(6) In the exemplary embodiment described above, the television screen is displayed on the information terminal 10 located in the middle of the three information terminals 10, 20, and 30 (see FIGS. 1A to 1C), and the buttons for adjusting a volume and the buttons for changing a channel are disposed in the information terminals 20 and 30 used as the belt. A program description and a program guide on a television image may be displayed on the information terminals 20 and 30. Buttons used for timer recording and/or timer viewing may be displayed on the information terminals 20 and 30.

(7) In the exemplary embodiment described above, the television screen is displayed on the information terminal 10 located in the middle of the three information terminals 10, 20, and 30 (see FIGS. 1A to 1C). A mail, a clock, a weather forecast, traffic information, a calendar, a contact book, and the like may be displayed.

(8) In the exemplary embodiments above, the term "processor" refers to hardware in a broad sense. Examples of the processor includes general processors (e.g., CPU), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a plurality of deformable devices to be worn on a living body for use, each device being configured to be detachably attached to at least another one of the devices, wherein
each device comprises
a display unit, and
a processor,
when communication among the plurality of devices is in a disconnection state, the processor of each device independently controls display of the corresponding one of the display units,
when the plurality of devices are in a communication state, the processors work cooperatively so as to control the display of the display units of the devices, and
the plurality of devices includes
a first device with a first display unit and a first processor,
a second device with a second display unit, a second processor, and a flexible body portion, wherein the second device, when attached to one side of the first device, is used as a tip end side of a belt to be wrapped around the living body, and a strain gauge is arranged along a longitudinal direction of the flexible body portion for detecting deformation of the flexible body portion, and
a third device with a third display unit, a third processor, and a body portion with a buckle, wherein the third device, when attached to another end of the first device, is used as a buckle side of the belt to be wrapped around the living body.

2. The information processing system according to claim 1, wherein
when the plurality of devices are in a separated state, the plurality of processors disconnect communication on at least a part of the plurality of devices, and
when the plurality of devices are coupled to each other, at least a part of the plurality of devices communicate with each other.

3. The information processing system according to claim 2, wherein the plurality of processors control power supply among the plurality of devices.

4. The information processing system according to claim 3, wherein the plurality of processors mutually notify remaining amounts of a plurality of batteries provided in the plurality of devices.

5. The information processing system according to claim 1, wherein the plurality of processors that are communicating with each other divide one image into sub-images and display the sub-images on the plurality of display units that are provided in the plurality of devices and that correspond to the plurality of processors, respectively.

6. The information processing system according to claim 5, wherein the plurality of processors that are communicating with each other divides the image on a condition that the plurality of display units, which correspond to the processors, respectively, are located adjacent to each other.

7. The information processing system according to claim 6, wherein when the display units are curved due to deformation of the plurality of devices which are coupled to each other, the plurality of processors control regions used in display on the display units according to degrees at which the display units are curved.

8. The information processing system according to claim 1, wherein the plurality of processors that are communicating with each other display an image related to operation on at least one of the plurality of display units provided in the plurality of devices which correspond to the processors, respectively.

9. The information processing system according to claim 8, wherein the image related to the operation is displayed on the display unit different from a display unit on which an image to be operated is displayed.

10. The information processing system according to claim 1, wherein the plurality of processors that are communicating with each other share data in the plurality of devices.

11. A non-transitory computer readable medium storing a program causing computers of deformable devices to execute information processing, each device including the computer and a display unit, the devices being to be worn on a living body for use, each device being configured to be detachably attached to at least another one of the devices, each device including a display and the computer,
the information processing comprising:
when communication among the plurality of devices is in a disconnection state, causing the computer of each device independently to control display of the corresponding one of the display units; and
when the plurality of devices are in a communication state, causing the computers to work cooperatively so as to control the display of the display units of the devices,
wherein the plurality of devices includes
a first device with a first display unit and a first processor,
a second device with a second display unit, a second processor, and a flexible body portion, wherein the second device, when attached to one side of the first device, is used as a tip end side of a belt to be wrapped around the living body, and a strain gauge is arranged along a longitudinal direction of the flexible body portion for detecting deformation of the flexible body portion, and
a third device with a third display unit, a third processor, and a body portion with a buckle, wherein the third device, when attached to another end of the first device, is used as a buckle side of the belt to be wrapped around the living body.

12. An information processing system comprising:
a plurality of deformable means to be worn on a living body for use, each deformable means being configured to be detachably attached to at least another one of the deformable means, wherein
each deformable means comprises
display means, and
processing means,
when communication among the plurality of deformable means is in a disconnection state, the processing means of each deformable means independently controls display of the corresponding one of the plurality of display means, when the plurality of deformable means are in a communication state, the plurality of processing means work cooperatively so as to control the display of the plurality of display means of the plurality of deformable means, and the plurality of deformable means includes
- a first deformable means with a first display means and a first processing means,
- a second deformable means with a second display means, a second processing means, and a flexible body portion, wherein the second deformable means, when attached to one side of the first deformable means, is used as a tip end side of a belt to be wrapped around the living body, and a strain gauge is arranged along a longitudinal direction of the flexible body portion for detecting deformation of the flexible body portion, and
- a third deformable means with a third display means, a third processing means, and a body portion with a buckle, wherein the third deformable means, when attached to another end of the first deformable means, is used as a buckle side of the belt to be wrapped around the living body.

\* \* \* \* \*